(12) United States Patent
Li et al.

(10) Patent No.: US 11,880,968 B2
(45) Date of Patent: Jan. 23, 2024

(54) DISTRIBUTED COMPUTING SYSTEM FOR PRODUCT DEFECT ANALYSIS

(71) Applicant: BOE TECHNOLOGY GROUP CO., LTD., Beijing (CN)

(72) Inventors: Zhaoyue Li, Beijing (CN); Dong Chai, Beijing (CN); Yaoping Wang, Beijing (CN); Meijuan Zhang, Beijing (CN); Hong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 668 days.

(21) Appl. No.: 17/043,960

(22) PCT Filed: Dec. 20, 2019

(86) PCT No.: PCT/CN2019/127071
§ 371 (c)(1),
(2) Date: Sep. 30, 2020

(87) PCT Pub. No.: WO2021/120186
PCT Pub. Date: Jun. 24, 2021

(65) Prior Publication Data
US 2023/0153974 A1    May 18, 2023

(51) Int. Cl.
*G06T 7/00* (2017.01)
*G05B 19/418* (2006.01)
(Continued)

(52) U.S. Cl.
CPC ...... *G06T 7/0004* (2013.01); *G05B 19/41875* (2013.01); *G06V 10/82* (2022.01); *G06V 10/96* (2022.01); *G05B 2219/32368* (2013.01); *G06T 2207/20081* (2013.01); *G06T 2207/20084* (2013.01); *G06T 2207/30148* (2013.01)

(58) Field of Classification Search
CPC ......... G06T 7/0004; G06T 2207/20081; G06T 2207/20084; G06T 2207/30148; G05B 19/41875; G05B 2219/32368
See application file for complete search history.

(56) References Cited

U.S. PATENT DOCUMENTS 11,232,550 B2 * 1/2022 Ben Baruch .......... G06V 10/82
2004/0028276 A1 2/2004 Okuda et al.
(Continued)

FOREIGN PATENT DOCUMENTS

CN    108564104    9/2018
CN    108921839    11/2018
(Continued)

OTHER PUBLICATIONS

Indian Office Action for corresponding Indian application No. 202147056757, dated of Aug. 1, 2022.
(Continued)

*Primary Examiner* — Bobbak Safaipour
(74) *Attorney, Agent, or Firm* — Leason Ellis LLP

(57) ABSTRACT

A distributed computing system for product defect analysis is disclosed. The distributed computing system for product defect analysis includes a computing cluster for processing product manufacturing messages, a computing cluster for identifying product defect, a product image database, and a client device.

17 Claims, 8 Drawing Sheets

(51) Int. Cl.
*G06V 10/82* (2022.01)
*G06V 10/96* (2022.01)

(56) References Cited

U.S. PATENT DOCUMENTS

| | | | |
|---|---|---|---|
| 2009/0063242 A1* | 3/2009 | Shaouy | G06Q 10/063112 |
| | | | 705/7.17 |
| 2019/0362486 A1 | 11/2019 | Diao et al. | |
| 2020/0005667 A1* | 1/2020 | Baker | G09B 19/00 |
| 2021/0097673 A1* | 4/2021 | Neumann | H01L 22/26 |
| 2021/0201081 A1* | 7/2021 | Wang | G06F 18/24765 |
| 2022/0036539 A1* | 2/2022 | Brauer | G06N 3/047 |
| 2022/0309764 A1* | 9/2022 | Liu | G06V 10/82 |
| 2023/0092247 A1* | 3/2023 | SayyarRodsari | G06N 3/045 |
| | | | 700/109 |
| 2023/0142383 A1* | 5/2023 | Zhang | G01N 21/8851 |
| | | | 356/237.2 |

FOREIGN PATENT DOCUMENTS

| | | |
|---|---|---|
| CN | 110059631 | 7/2019 |
| CN | 110441312 | 11/2019 |
| CN | 110554047 | 12/2019 |
| JP | 2018169710 A | 11/2018 |
| JP | 2019190891 A | 10/2019 |
| WO | 9735337 A1 | 9/1997 |

OTHER PUBLICATIONS

Extended European Search Report for corresponding European Application No. 19945459.6, dated Nov. 29, 2022.
Office Action, and English translation for corresponding Japanese Application No. 2022-502980, dated Jul. 18, 2023.

* cited by examiner

US 11,880,968 B2

DISTRIBUTED COMPUTING SYSTEM FOR PRODUCT DEFECT ANALYSIS

CROSS-REFERENCE TO RELATED PATENT APPLICATIONS

This application is a U.S. National Stage Application under 35 U.S.C. § 371 of International Patent Application No. PCT/CN2019/127071, filed Dec. 20, 2019, which is incorporated by reference in its entirety.

TECHNICAL FIELD

The embodiments of the present disclosure relate to a distributed computing system for product defect analysis, a product defect analysis method, and a non-volatile computer-readable storage medium.

BACKGROUND

In the product manufacturing process, for example, in the manufacturing process of semiconductor products, due to the problems in devices, parameters, operations, environments, and the like, the produced products may not meet the process requirements or even lead to defects. Therefore, it is necessary to calculate and identify immediately defect types, defect sizes, defect positions, and other information of defective products that do not meet the requirements after each process, and make timely correction and improvement to avoid the continuation of defects. Currently, traditional identification methods mainly rely on manual detection. This requires professional training for inspectors, especially in the case of multiple product models and complex problems. For example, semiconductor products have a wide range of defects, which may include particle, remain, weak line, hole, splash, electrostatic breakdown, wrinkle, film color, bubble, and the like. It requires a long and dedicated time and attention from inspectors to find defects and make relevant judgments.

In summary, the existing technical means have problems of low efficiency and low accuracy.

SUMMARY

A distributed computing system for product defect analysis is disclosed, which is used for product defect analysis in a product manufacturing process. The distributed computing system for product defect analysis comprises a computing cluster for processing product manufacturing messages, a computing cluster for identifying product defect, a product image database, and a client device, wherein: the product image database is configured to store product images generated in the product manufacturing process; the computing cluster for processing product manufacturing messages is configured to generate product defect analysis tasks according to product manufacturing messages, wherein the product defect analysis tasks include a first defect identification task; the computing cluster for identifying product defect is configured to identify product defect content in one of the product images through a defect identification model based on the first defect identification task, wherein the product defect content includes any one or more of: defect type, defect position, and defect size of products; and the client device is configured to output a product defect identification result.

A product defect analysis method based on a distributed system is disclosed, which comprises: generating product defect analysis tasks according to product manufacturing message, wherein the product defect analysis tasks include a first defect identification task; identifying product defect content in a product image by a defect identification model based on the first defect identification task, wherein the product defect content includes any one or more of: defect type, defect position, and defect size of products; and outputting a product defect identification result.

A non-volatile computer-readable storage medium with computer programs stored thereon is disclosed, when the programs are executed by a processor, the above product defect analysis method is implemented.

BRIEF DESCRIPTION OF THE DRAWINGS

In order to more clearly illustrate the technical scheme of at least one example embodiment of the present disclosure, the following is a brief description of the drawings required to be used in the description of the example embodiment. The drawings in the following description are merely exemplary embodiments of the present disclosure.

DETAILED DESCRIPTION

Figure 1:
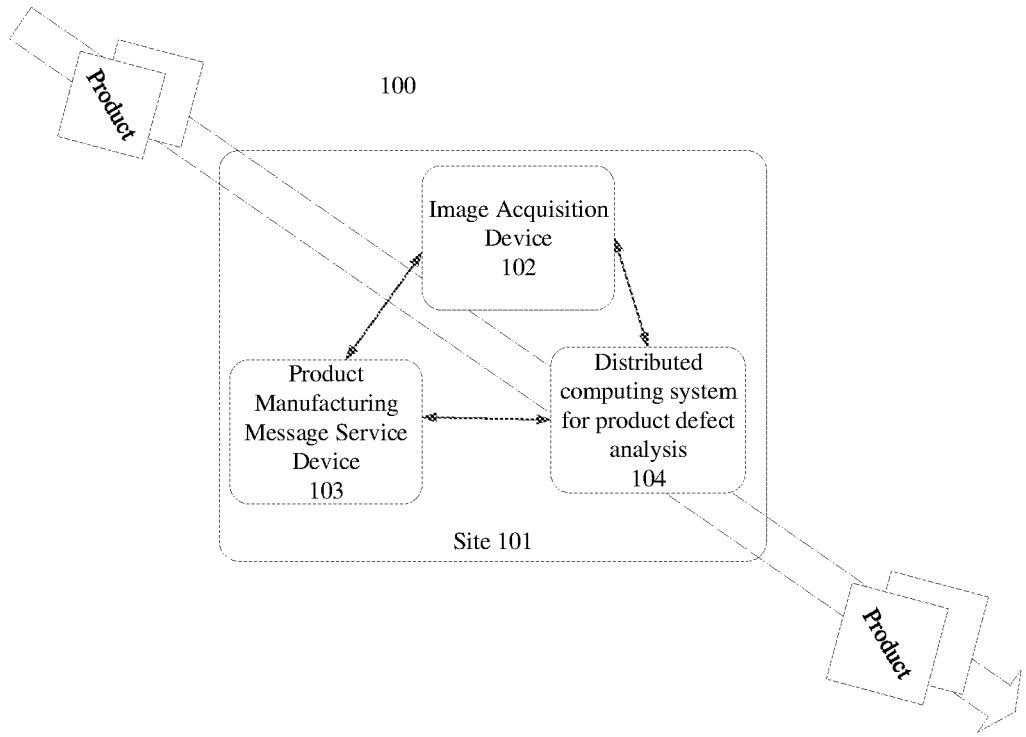
FIG. 1 is a schematic diagram illustrating a scene in the manufacturing process of products.

Examples of the present disclosure are more fully described below with reference to the accompanying drawings, in which examples of the present disclosure are illustrated. However, the present disclosure may be implemented in many different forms, and the present disclosure should not be construed as being limited by the examples set forth herein. Throughout the text, similar markings are used to indicate similar components.

The terms used herein are used only for the purpose of describing particular embodiments and are not intended to limit the present disclosure. As used herein, the singular form of "one", "this" is intended to include the plural form as well, unless the context clearly indicates otherwise. It is also to be understood that, when used herein, the term "includes" designates the occurrence of the declared feature, whole, step, operation, element, and/or component, but does not preclude the occurrence or addition of one or more other features, wholes, steps, operations, elements, components, and/or groups thereof.

Unless otherwise defined, terms used herein, including technical and scientific terms, shall have the same meaning as those commonly understood by one of ordinary skill in the art in the field to which this disclosure pertains. Terms used herein are to be interpreted as having a meaning consistent with their meaning in the context of the specification and in the field in question, and not in an idealized or overly formalized sense, unless specifically so defined herein.

The disclosure is described below with reference to block diagrams and/or flowcharts illustrating methods, devices (systems), and/or computer program products according to embodiments of the disclosure. It is to be understood that a box, as well as a combination of boxes, of the block diagram and/or flowchart illustration may be implemented by computer program instructions. These computer program instructions may be provided to a general-purpose computing device, a processor of a dedicated computing device, and/or other programmable data processing device, such that the instructions executed by the computing device processor and/or other programmable data processing device create methods for implementing the functions/actions specified in the block diagram and/or flowchart block.

Accordingly, hardware and/or software (including firmware, resident software, microcode, etc.) may also be used to implement the present disclosure. Further, the present disclosure may take the form of a computer program product on a computer-usable or computer-readable storage medium having computer-usable or computer-readable program code implemented in the medium for use by or in conjunction with an instruction execution system. In this disclosure context, the computer-usable or computer-readable medium may be any medium that contains, stores, communicates, transmits, or conveys a program for use by or in conjunction with an instruction execution system, device, or equipment.

At present, during defect detection in product manufacturing, manual analysis of product manufacturing messages is still mainly used. In the relevant quality inspection procedure of the product manufacturing, there are many unstable factors in manual inspection, which leads to a decline in the accuracy of the quality inspection, thereby bringing potential impacts to the product quality. On the other hand, in the detection process, it is inefficient that all the data is manually entered. At the same time, information obtained manually on an image of a product to be detected within a limited time is relatively coarse, which brings inconvenience to the subsequent search and analysis of defect causes. Based on all or part of the above reasons, the present disclosure provides the following embodiments.

It should be noted that the present disclosure is described in the context of semiconductor product manufacturing, but it is conceivable that the embodiments of the present disclosure are not limited to be applied to semiconductor product manufacturing, but can be applied to the manufacturing process of any product.

The products mentioned below include raw materials in the actual manufacturing process, as well as semi-finished or finished products after each process (which may be processed by a product manufacturing device). For example, in the semiconductor industry, products include glasses that begin to enter the production-line, array substrates that have gone through the exposure process, screens that have gone through cell-assembly, etc. Product images include product images directly obtained by image acquisition devices (such as cameras, automated optical inspection (AOI) devices, etc.), as well as product images that contain defect content labels (i.e., product images that have gone through the identification of defect content).

The product manufacturing system in the factory is relatively complex. The processing of the product manufacturing messages involves the communication of multiple systems, transmissions of files and images, and schedules of hardware resources. Also, the entire system needs to ensure high availability and high concurrency to ensure the smooth progress of product manufacturing.

For this reason, the present disclosure provides a distributed computing system for product defect analysis, a method thereof, and a computer-readable storage medium, which can be applied to the manufacturing of various products, particularly the manufacturing process of semiconductor display devices, to improve the efficiency of product defect identification in the product manufacturing process.

FIG. 1 is a schematic diagram illustrating a scene 100 in the product manufacturing process.

As shown in FIG. 1, multiple products pass through a site 101 in scene 100 in turn. The site 101 indicates a system composed of one or more devices that products may pass through when completing a processing technique in the entire production-line flow.

For example, as for the photolithography process of an array substrate in the semiconductor industry, the site 101 corresponding to this process may include a system composed of a cleaning device, a pre-baking device, a cooling device, a coating device, an exposure device, a developing device, a post-baking device, a cooling device, etc. The site 101 may also be a single device (an exposure device) corresponding to the exposure process. If a product enters the site 101, a trackin message is captured by the site 101. If a product leaves the site 101, a trackout message is captured by the site 101. In order to ensure the product quality, product information/product data in the trackin message and the trackout message need to satisfy the requirements of product manufacturing.

The site 101 may also be a virtual site in the product manufacturing process, which indicates the processing steps in non physical form. For example, product defect analysis is taken as one process. And the site 101 is taken as a product defect analysis system. The site 101 may be configured to perform defect analysis on products passing through, to obtain and analyze all the process information for product defect inspection, and then to determine product defects. If the product defect cannot satisfy product manufacturing requirements, an alarm is triggered by the site 101, which makes the product not enter the next site. Or, an indication that the product needs to enter a site for maintenance process is issued from the site 101.

The site 101 may include a distributed computing system 104 for product defect analysis. The site 101 may also include any one or more of an image acquisition device 102 and a product manufacturing message service device 103.

The image acquisition device 102, the product manufacturing message service device 103, and the distributed computing system 104 for product defect analysis may be computing devices that include processors and memories. These devices may be connected with each other via a network. The above devices may be directly or indirectly communicated with each other. For example, they can send and receive data and/or signals via a network. The network may be the Internet of Things based on the Internet and/or telecommunication network, which may be a wired network or a wireless network. For example, the network may be an electronic network that can realize the function of information exchange such as a local area network (LAN), a metropolitan area network (MAN), a wide area network (WAN), and a cellular data communication network.

In the present disclosure, the site 101 is mainly applied to the detection, analysis, and processing of product defect. It should be understood by those skilled in the art that the site 101 may also be applied to other processes of product manufacturing.

The image acquisition device 102 is configured to obtain product images of products in the manufacturing process. The image acquisition device 102 may be a photographic camera, a camera, or other devices. For example, during screen defect detection in the semiconductor industry, the image acquisition device 102 may be an Automated Optical Inspection (AOI) device. The AOI device can be configured to perform an optical inspection on the products in the manufacturing process, to determine the differences between the product images and standard product images, to determine defects and take a photograph, and then to obtain product images with product defect graphs to facilitate the subsequent identification and analysis of the defect type. The image acquisition device 102 may also be other cameras or photographic cameras having an image acquisition function. The image acquisition device 102 may send captured product images and corresponding files to a product image database. The product image database may be a distributed file system (DFS) or other data storage devices.

The product manufacturing message service device 103 is configured to monitor and manage all or part of product manufacturing messages generated in the product manufacturing process. In the intelligent manufacturing process, a large amount of product manufacturing messages are generated. A product manufacturing message includes production record information generated in the product manufacturing process. The information about product manufacturing devices that the product has pass through and the result obtained after a product being processed by these devices can be obtained from the product manufacturing messages. For example, the product manufacturing message service device 103 includes a manufacturing execution system (MES), and may also include an executive information system (EIS); and the product manufacturing message service device 103 may also be other devices used for monitoring product manufacturing. No limitation will be given here in the present disclosure. The product manufacturing message service device 103 may be configured to capture all or part of the product manufacturing messages in the product manufacturing process, and propagate or send the product manufacturing messages to the distributed computing system 104 for product defect analysis.

The distributed computing system 104 for product defect analysis may be configured to perform further processing on the product manufacturing messages, and generate product defect analysis tasks for the detection analysis of the product defects. The product defect analysis tasks include tasks for performing defect identification on products by utilization of defect identification models, tasks for performing detect identification on products by inspectors, and tasks for training defect identification models, etc. The distributed computing system 104 for product defect analysis can be configured to return an analysis result to the product manufacturing message service device 103 after completing product defect analysis, and also return an analysis result to the image acquisition device 102.

Figure 2:
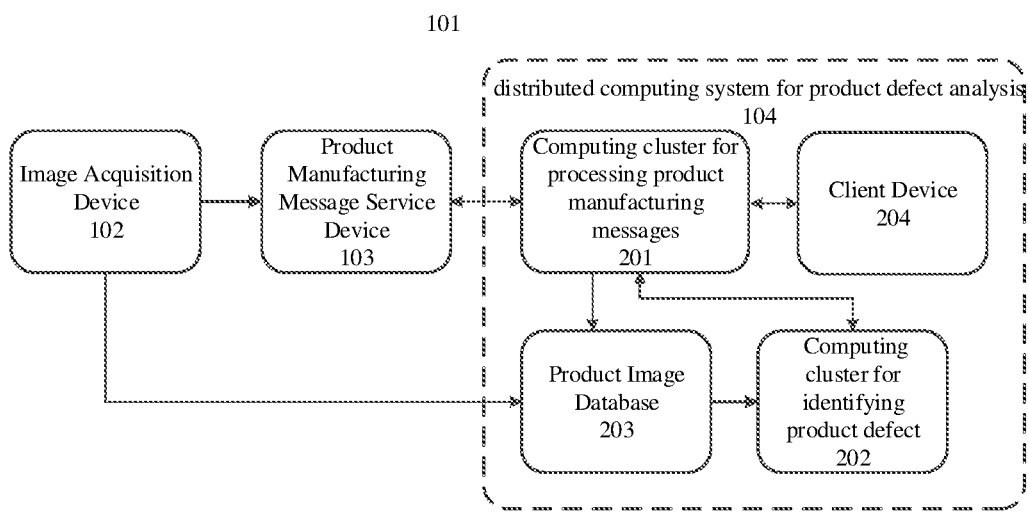
FIG. 2 is a schematic diagram of a site in accordance with at least one embodiment of the present disclosure.

FIG. 2 is a schematic diagram of a distributed computing system 104 for product defect analysis provided by at least one embodiment of the present disclosure.

The distributed computing system 104 for product defect analysis is a system formed by a group of computers that are connected to each other through the network to deliver messages and communication and coordinate their behaviors. Components thereof are interactive with each other to achieve a common goal. The network may be the Internet of Things based on the Internet and/or telecommunication network, which may be a wired network or a wireless network. For example, the network may be a LAN, an MAN, a WAN, a cellular data communication network, or any electronic network that can realize the function of information exchange. The distributed computing system may include software components such as software objects or other types of individually addressable isolated entities, such as distributed objects, agents, actors, virtual components, etc. In general, each such component is individually addressable and has a unique identity (such as an integer, a globally unique identifier (GUID), a string, or an opaque data structure) in the distributed system. In a distributed system that allows geographic distribution, applications can reside in a computing cluster by deployment. There are various systems, components, and network configurations that support distributed computing environment. For example, the computing system may be connected with each other through a wired or wireless system via a local network or a widely distributed network. Of course, many networks are coupled to the Internet, which provides an infrastructure for widely distributed computing, and includes many different networks. Any network infrastructure can be used for system-prone communication described in, for example, various examples.

The distributed computing system 104 for product defect analysis provides the sharing of computer resources and services through the communication exchange between computing devices and systems. These resources and services include information exchange for objects (such as files), cache storage devices, and disk storage devices. These resources and services also include the sharing of the processing capacity across multiple processing units for load balancing, resource expansion, processing specialization, etc. For example, the distributed computing system 104 for product defect analysis may include client devices/servers, and a host provided with network topologies and network infrastructure such as and peer-to-peer or hybrid architectures.

FIG. 2 is a schematic diagram of a site 101 provided by at least one embodiment of the present disclosure.

As shown in FIG. 2, the distributed computing system 104 for product defect analysis may include a computing cluster 201 for processing product manufacturing messages, a computing cluster 202 for identifying product defect, a product image database 203, and a client device 204. The distributed computing system 104 for product defect analysis may also include other servers (such as a model management server) or computing clusters.

The above computing cluster (for example, the above computing cluster 201 for processing product manufacturing messages and the above computing cluster 202 for identifying product defect) may include two or more mutually independent computers connected with each other through the network. These computers form a group and are managed in the mode of a single system. A computing cluster may be taken as an independent server if it is interactive with outside world.

The distributed computing system 104 for product defect analysis may also include programs, methods, data storage, programmable logics and the like running on the computing cluster 201 for processing product manufacturing messages, the computing cluster 202 for identifying product defect, the client device 204, and the product image database 203. It can be understood that the devices in the distributed computing system 104 for product defect analysis may be different types of hardware devices such as personal digital assistants (PDAs), audio/video devices, mobile phones, moving picture experts group audio layer III (MP3) players, personal computers (PCs), laptop computers and servers.

The distributed computing system 104 for product defect analysis may include a computing cluster 201 for processing product manufacturing messages, a computing cluster 202 for identifying product defect, and a client device 204. Optionally, the product manufacturing message service device 103 and the image acquisition device 102 may also be included in the distributed computing system 104 for product defect analysis. The computing cluster 201 for processing product manufacturing messages may be communicated with the product manufacturing message service device 103. The product manufacturing message service device 103, the computing cluster 201 for processing product manufacturing messages and the computing cluster 202 for identifying product defect may be a computing device including a processor and a memory. These devices may be connected with each other through the network. The above devices may be directly or indirectly communicated with each other, for example, sending and receiving data and/or signals through the network.

The product image database 203 is configured to store product images produced in the product manufacturing process. The product images produced in the product manufacturing process may include product images obtained by the image acquisition device 102 in the product manufacturing process, and may also include product images obtained by other ways and stored into the product image database. For example, after the AOI device obtains the product images, the product images may be directly stored in the product image database 203 and may also be stored in a factory database, and then the product images in the factory database are transmitted to the product image database 203. The transmission of the product images to the product image database 203 by the factory database can ensure that other data in the factory is not affected if the distributed computing system 104 for product defect analysis performs invoke, storage, and other operations on the product images in the product image database 203. The product image database 203 may be a DFS and may also be a relevant database (Oracle, Redis, and MySQL).

The computing cluster 201 for processing product manufacturing messages is configured to generate product defect analysis tasks according to the product manufacturing messages. The product defect analysis task includes a first defect identification task.

As described above, the distributed computing system 104 for product defect analysis may be taken as a detection site in the entire product manufacturing process. Products of different production-lines of the factory may flow into the site in the detection process. At present, in the factory, due to rich products and complex processes, a large number of product manufacturing messages will be generated. The computing cluster 201 for processing product manufacturing messages may be configured to obtain product manufacturing messages generated by the image acquisition device 102 or product manufacturing messages received by the product manufacturing message service device 103, to analyze the content of the product manufacturing messages, and to generate product defect analysis tasks. Thus, the task for allocating and scheduling for other devices and computing clusters of the distributed computing system 104 for product defect analysis is realized. The computing cluster 201 for processing product manufacturing messages may be further configured to feedback the product manufacturing messages generated by the distributed computing system 104 for product defect analysis to the product manufacturing message service device 103.

In the present disclosure, the product manufacturing message may include product manufacturing site information and/or product information. The product manufacturing site information includes the identification of the site, the physical location of the site (e.g., the physical location of the AOI device), the node information of the site in the product manufacturing process (e.g., defect identification/detection in the exposure process, defect identification/detection in the cleaning process, etc.), etc. The information can be helpful for identifying or positioning a specific site. The product information may be product type, product name, product identity, product superiority, etc. This information can be helpful for identifying or positioning a specific product. It should be understood by those skilled in the art that the content of the product manufacturing messages is not limited to the above examples, as long as the content is related to defect identification/detection in the product manufacturing process.

The product manufacturing message may be a lot-product manufacturing message and may also be a single-product manufacturing message. For example, when a screen product of the product production-line is inspected by the AOI device, a single-product manufacturing message may be sent as a product manufacturing message from the AOI device to the product manufacturing message service device 103 after the inspection on a screen (or a large glass substrate screen, also referred to as Glass) is completed, and picture files (.jpg/.gls) may be sent from the AOI device to the product image database 203. A single-product manufacturing message may also be sent from the AOI device to all the activated devices in the current factory. The AOI device may also be configured to send a lot-product manufacturing message by taking a LOT as a unit (1 Lot contains 20 Glass, and each Glass is a single large glass substrate screen). For example, if the inspection of one LOT is completed, a lot-product manufacturing message (e.g., lot-product information), taken as one product manufacturing message, may be sent from the AOI device to the product manufacturing message service device 103 or any other relevant device. In the product manufacturing process, a lot of products are generally taken as a unit for manufacturing activity. And the product manufacturing sites and the process flows that a lot of products pass through are all consistent. Thus, lot-product manufacturing messages are usually taken as one product manufacturing message and transmitted in the factory. Thus, product manufacturing message management is more efficient.

The product manufacturing message may contain content irrelated to product defect identification. The computing cluster 201 for processing product manufacturing messages may be configured to analyze the product manufacturing message, obtain information related to product defect identification (such as the product type), generate corresponding product defect analysis request message on basis of the information, and issue product defect analysis tasks through sending product defect analysis request messages.

For example, in the process of analyzing one lot-product manufacturing message, the computing cluster 201 for processing product manufacturing messages may be configured to obtain the amount of product images, corresponding product types of product images, the sizes of product images, and the like contained in multiple products from the product manufacturing message. The product image may be an image captured in any production step of the semiconductor screen from substrate, deposition, etching to final cell-assembly. In the process of generating the product defect analysis request message, it may be necessary for the computing cluster 201 for processing product manufacturing messages to determine a product type to be analyzed in the product defect analysis task, and a type of the product defect analysis task to be executed (for example, artificial intelligence (AI) identification, manual identification, etc.). Subsequently, the computing cluster 201 for processing product manufacturing messages may also be configured to perform message format verification on the product defect analysis request message, and then issue the product defect analysis tasks to other devices (such as the computing cluster 202 for identifying product defect and the client device) in the distributed computing system 104 for product defect analysis through sending the product defect analysis request message if the format of the product defect analysis request message is qualified. The product defect analysis task type is used for indicating different types of product defect analysis tasks. The product defect analysis task includes a first defect identification task, wherein the first defect identification task refers to a task that performs defect identification based on AI, and the task may be executed by the computing cluster 202 for identifying product defect. Thus, the computing cluster 201 for processing product manufacturing messages may be configured to generate the first defect identification task according to the product manufacturing message, and send the first defect identification task to the computing cluster 202 for identifying product defect.

The computing cluster 202 for identifying product defect may be one or more devices capable of utilizing graphics processing unit (GPU) computational resources to execute AI reasoning (visual identification) and training tasks. The reasoning task executed based on AI may be a defect identification task based on a defect identification model, and the defect identification model is mainly a neural network model based on deep learning. For example, the defect identification model may be based on a feedforward neural network. The feedforward network can be implemented as an acyclic graph, wherein nodes are arranged in layers. Generally, a feedforward network topology includes an input layer and an output layer, and the input layer and output layer are separated by at least one hidden layer. The hidden layer transforms the input received by the input layer into a useful representation for generating output in the output layer. Network nodes are fully connected to nodes in adjacent layers via edges, but there are no edges between nodes in each layer. Data received at the nodes of the input layer of the feedforward network is propagated (namely "feedforward") to nodes of the output layer through an activation function. The status of the nodes of each continuous layer in the network is calculated by the activation function based on coefficients ("weights"), and the coefficients are respectively related to each of the edges that connect these layers. The output of the defect identification model may adopt various forms, and no limitation will be given here in the present disclosure. The defect identification model may also include other neural network models such as a convolutional neural network (CNN) model, a recurrent neural network (RNN) model, or a generative adversarial network (GAN) model, but not limited thereto. Other neural network models that are commonly known by those skilled in the art may also be adopted as the defect identification model.

The neural network model must be generally obtained by training. The computing cluster 202 for identifying product defect may also be configured to train the neural network model, which mainly includes the following steps: selecting a network topology; using a group of training data that indicates problems subjected to network modeling; and adjusting the weights until the network model has the smallest error for all instances of a training data set. For example, in the supervised learning training process for neural networks, the output produced by the network in response to the input representing the instance in the training data set is compared with the "correct" marked output of the instance; error signals that indicate the differences between the output and the marked output are calculated; and if the error signal is propagated backwards through the layers of the network, the weights associated with the connections are adjusted to minimize the error. If the error of each output generated from the instance of the training data set is minimized, the neural network model is construed as "has been trained" and can be used for AI reasoning tasks.

The reasoning and training process of the neural network model involves buffer areas of a large amount of parameters, activation values, and gradient values, each value of which may be completely updated in each training iteration, which requires very high calculation and throughput capabilities. The GPU has strong parallelism and high memory bandwidth, and is highly efficient in processing calculations associated with training deep neural networks. Thus, the adoption of a GPU cluster integrated with multiple GPUs can effectively improve the training and reasoning speed of the neural network model. And the computing cluster 202 for identifying product defect can also be configured to schedule and allocate hardware resources.

In at least one embodiment of the present disclosure, the computing cluster 202 for identifying product defect may be configured to identify the product defect content in the product image through the defect identification model based on the first defect identification task. The content of product defect contains any one or more of the defect type, the defect position, and the defect size of a product. After receiving the first defect identification task sent by the computing cluster 201 for processing product manufacturing messages, the computing cluster 202 for identifying product defect is configured to identify the content of product defect, namely any one or more of the defect type, the defect position, and the defect size of the product, of the product image stored in the product image database 203 through the trained defect identification model.

In the embodiment of the present disclosure, the implementation of identifying the product defect content in the product image through the defect identification model based on the first defect identification task is as follows. Firstly, the product image is scaled to a fixed pixel size M×N (may also be not scaled), and the M×N image is sent to a deep convolutional neural network (for example, VGG/Resnet/ MobileNet, etc.). Secondly, feature maps of the entire image are obtained through multiple convolutional layers, activation layers, and pooling layers. Thirdly, the feature maps are input into a region proposal network (ZF/SSD/RPN, etc.), and proposal regions are obtained by calculation. Fourthly, proposal feature maps of the proposal regions are obtained by performing operations (such as convolution and pooling) on the proposal regions, and the proposal feature maps are sent to the subsequent fully-connected network and a softmax network for classification (i.e, to classify the proposal into defect types). The defect type with the largest probability is determined as the final classification result. The category and probability are recorded. In addition, the coordinate and the size of the proposal region represent the position and the size of the defect. The methresod of identifying the product defect content based on the defect identification model can adopt similar modifications to the above method or other methods known to those skilled in the art, which is not limited by the present disclosure.

For example, in the semiconductor industry, the defect categories may include particle, remain, line, hole, splash, wrinkle, film color, bubble, and the like. More subclasses may also be divided based on each defect type. For example, the particle type may be divided into P1 (Normal Particle), P2 (Sand Particle), P3 (Wall Particle), and the like based on different types of particle defects. The defect position may indicate the specific coordinate position of the defect in the product image. And then the specific coordinate position of the defect on the circuit board, the relationship between the defect and the background circuit (for example, whether the defect falls completely inside the Gate, intersects with the Gate, or near the outside of the Gate, etc.), and the like are determined. The defect size may include the length of the defect, the regional area of the defect, etc.

The computing cluster 201 for processing product manufacturing messages and the computing cluster 202 for identifying product defect may be taken as a server in a client device/server architecture to provide data services, such as, receiving data from the client device 204, storing data, processing data, and transmitting data to the client device 204. The server is generally a remote computer system accessible through a remote or local network (such as the Internet or wireless network infrastructure).

The client device 204 is configured to output a product defect identification result. The client device 204 may be one or more terminals for showing the product defect identification result to relevant staff. The product defect identification result may include the product defect identification content, and may further include alarm information after analysis based on the product defect content, and the like. The client device 204 may include a display, and the display can display the product defect content identified by the computing cluster 202 for identifying product defect, so that relevant staff can perform further judgment and analysis on the product defect. The client device 204 may also include an alarm unit which is configured to give the alarm to the defect identification result so as to warn relevant staff to deal with the defect identification result accordingly.

For example, the client device 204 may be a computer that access to sharable network resources provided by another computer (e.g., a server). The client device 204 can be a process of requesting a service provided by another program or process, such as a set of instructions or tasks. The client device process utilizes the requested service without having to "know" any working details about other programs or the service itself. For example, in the embodiment of the present disclosure, the client device 204 utilizes the collective ability of the computing cluster 201 for processing product manufacturing messages and the computing cluster 202 for identifying product defect to benefit the entire product production-line. At this point, the devices in the distributed computing system 104 for product defect analysis may have applications, objects, or resources that can participate in a resource management mechanism. The client device 204 may also contain applications and can utilize application programming interfaces (APIs) or other objects, software, firmware, and/or hardware suitable for communicating with or implementing applications provided by the embodiments of the present disclosure.

Depending on the circumstances, the above computing cluster 201 for processing product manufacturing messages, the above computing cluster 202 for identifying product defect and the above client device 204 can all be construed as the client device, the server, or both, and the present disclosure is not limited thereto. The devices in the distributed computing system 104 for product defect analysis can all be mobile and communicate with each other through communication media, thereby providing distributed functionality and allowing a plurality of client devices 204 to utilize the information gathering ability of the server.

The application splits the defect analysis task of the site through the distributed computing system 104 for product defect analysis to form the computing cluster for processing product manufacturing messages for system scheduling, the computing cluster for identifying product defect for AI reasoning/training, the computing cluster for model management which updates model deployment, the product image database for data storage, the client device for outputting the product defect analysis result, etc. The distributed computing system 104 for product defect analysis can store a plurality of sub-tasks and respectively deploy these sub-tasks into different servers. And a highly available computing cluster is also made in each single point server. In some embodiments, a computing cluster for system scheduling and a computing cluster for model management may be taken as one computing cluster. Therefore, the distributed computing system 104 for product defect analysis can shorten the processing time of each product image, so that relevant staff on the product production-line can intuitively monitor the production progress of the product on the production-line, thereby improving the product quality.

Figure 3:
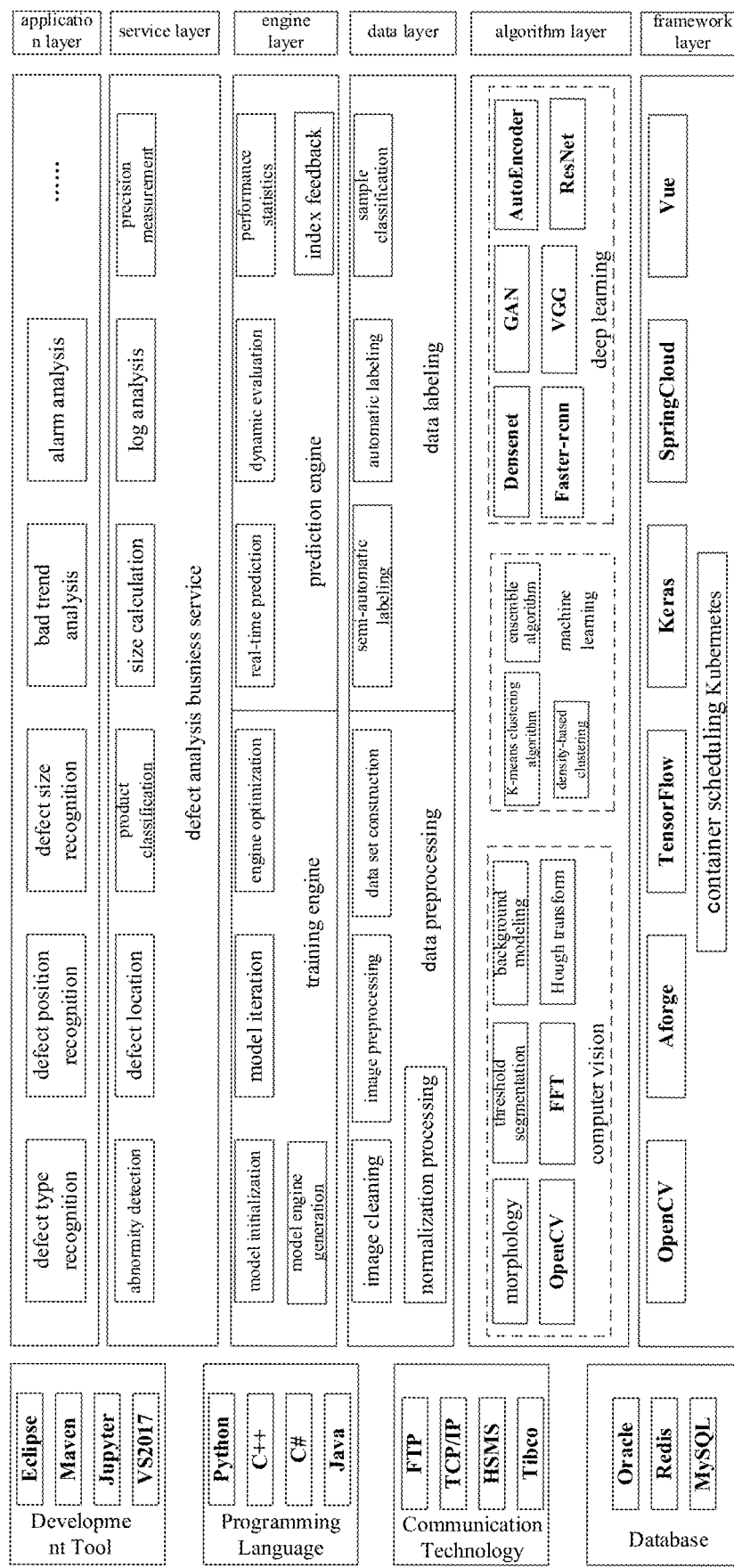
FIG. 3 is another schematic diagram of a distributed computing system for product defect analysis provided by at least one embodiment of the present disclosure.

FIG. 3 is another schematic diagram of a distributed computing system 104 for product defect analysis provided by at least one embodiment of the present disclosure, which illustratively shows the technical architecture of the distributed computing system 104 for product defect analysis.

The distributed computing system 104 for product defect analysis may use development tools such as Eclipse, Maven, Jupyter, and VS2017 for development. The development languages include Python, C++, C#, Java, etc. The devices and the computing clusters in the distributed computing system 104 for product defect analysis may be communicated with each other through one or more communication protocols such as FTP, TCP/IP, HSMS, and Tibco. Optionally, the distributed computing system 104 for product defect analysis may also use a plurality of different databases (such as DFS, Oracle, Redis, and MySQL) to store data, images, defect identification models, etc.

As shown in FIG. 3, the distributed computing system 104 for product defect analysis can be divided into an application layer, a service layer, an engine layer, a data layer, an algorithm layer, and a framework layer as a whole.

The application layer can realize functions such as defect type identification, defect position identification, defect size identification, bad trend analysis, and alarm analysis. The client device 204 may provide a GUI through a display of the client device. Images that are labeled with defect position and size, results of defect types, results of bad trend analysis, results of alarm analysis, and the like may be displayed on the GUI.

The service layer can be configured to realize the functions such as abnormity detection, defect location, product classification, size calculation, log analysis, and precision measurement. These functions may be implemented with the client device 204. These functions may also be implemented by the computing cluster 202 for identifying product defect or the computing cluster 201 for processing product manufacturing messages.

The engine layer includes a training engine configured to train the defect identification model. The training engine can realize the functions of initializing a defect identification model, iterating the defect identification model, optimizing an engine, and generating a defect identification model engine. The engine layer also includes a prediction engine configured to utilize the defect identification model to identify the product defect content from the product image. The prediction engine can be configured to realize functions such as real-time prediction, dynamic evaluation, performance statistics gathering, and index feedback. Various functions of the engine layer may be implemented by the computing cluster for model management and may also be implemented by the product defect identification model.

The data layer includes a module for data preprocessing. Data preprocessing includes image cleaning, image preprocessing, data set construction and normalization. The data layer may also include a module for data labeling. Data labeling includes semi-automatic labeling, automatic labeling, sample classification, and the like on the product images. The module for data preprocessing and the module for data labeling can be included in the computing cluster for model management and may also be included in the computing cluster 201 for processing product manufacturing messages. Data in the data layer may be stored in the product image database 203.

The algorithm layer includes an algorithm related to computer vision, machine learning, and deep learning. Algorithms related to computer vision include algorithms related to morphology, threshold segmentation, background modeling, OpenCV, Fourier transform (FFT) and Hough transform. Algorithms related to machine learning include K-means clustering algorithm, ensemble algorithm, density-based clustering algorithm, etc. Algorithms related to deep learning include Densenet, GAN, AutoEncoder, Faster-rcnn, VGG, ResNet algorithm, etc.

The frame layer covers the framework used by the distributed computing system 104 for product defect analysis in the architecture-building process, e.g., OpenCV, Aforge, TensorFlow, Keras, SpringCloud, Vue, and Kubernetes for container scheduling.

It should be understood by those skilled in the art that the techniques that the distributed computing system 104 for product defect analysis can apply are not limited to the above examples. The embodiment of the present disclosure is not limited thereto.

Figure 4:
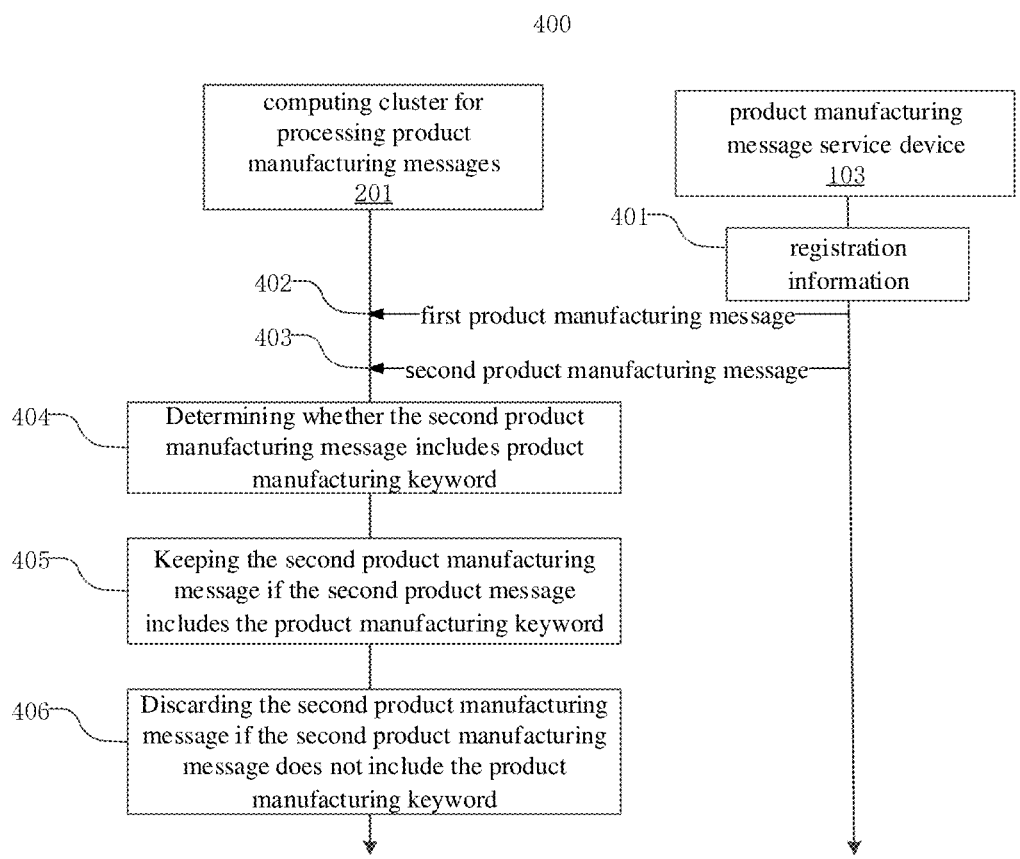
FIG. 4 is a flowchart of a method for processing product manufacturing messages in accordance with at least one embodiment of the present disclosure.

FIG. 4 is a flowchart of a method 400 for processing product manufacturing messages in accordance with at least one embodiment of the present disclosure, which shows a process in which the product manufacturing messages are processed by the computing cluster 201 for processing product manufacturing messages.

The computing cluster 201 for processing product manufacturing messages is configured to monitor the product manufacturing messages. The method of monitoring the product manufacturing messages may include: polling and interrupt. The monitoring of the product manufacturing messages by polling refers to continuously monitoring and receiving the product manufacturing messages at a preset frequency. Monitoring by interrupt indicates that the computing cluster 201 for processing product manufacturing messages monitors and receives the product manufacturing message if it is notified that a specific product manufacturing message is generated; and then interrupts monitoring after receiving the product manufacturing message; and continue monitoring if notified that a specific product manufacturing message is generated again. Optionally, monitoring by interrupt requires the information registration of a product manufacturing message sending device in advance.

In operation 401, registration information setting is provided for the product manufacturing message service device 103. Registration information includes product manufacturing site information and/or first product information. The registration information setting on the product manufacturing message service device 103 may be implemented by the computing cluster 201 for processing product manufacturing messages sending the registration information to the product manufacturing message service device 103. And it may also be implemented by directly setting registration information on the product manufacturing message service device 103. Through the registration information, the product manufacturing message service device 103 can be acknowledged what kind of product manufacturing messages related to the registration information the computing cluster 201 for processing product manufacturing messages would like to know. The product manufacturing messages related to the registration information include product manufacturing site information or first product information. Thus, when collecting a product manufacturing message related to the registration information, the product manufacturing message service device 103 can preferentially send the product manufacturing message to the computing cluster 201 for processing product manufacturing messages. Thus, the computing cluster 201 for processing product manufacturing messages can monitor the product manufacturing messages by interrupt. The product manufacturing site information includes one or more of the identification of the site, the physical position of the site (for example, the physical position of the AOI device), the node information of the site in the product manufacturing process (for example, defect identification/detection in the exposure process, defect identification/detection in the cleaning process, etc.), etc. This information can help identifying or positioning a specific site. The first product information may be one or more of a product type, product name, product identification, product priority, etc., which may assist in identifying or locating a specific product. It should be understood by those skilled in the art that the content of the product manufacturing site information and the first product information is not limited to the above example, as long as the content is related to defect identification/detection in the product manufacturing process. Description is given in FIG. 4 by taking the registration of the product manufacturing message service device 103 as an example. It should be understood by those skilled in the art that the image acquisition device 102 can also be registered.

In operation 402, based on the registration information, the computing cluster 201 for processing product manufacturing messages is configured to monitor a first product manufacturing message by interrupt. Wherein, the first product manufacturing message includes product manufacturing messages related to the registration information. The first product manufacturing message may be a lot-product manufacturing message or a single-product manufacturing message, as long as the first product manufacturing message is related to the product manufacturing site information or the first product information in the registration information. If the first product manufacturing message is related to the product manufacturing site information, the first product manufacturing message may include site variation information, site status information, and the like identified by the product manufacturing message service device 103. If the first product manufacturing message is related to the first product, the first product manufacturing message may include the address where the product images are stored, the quantity of product images corresponding to the product, the manufacturing process of the current product, etc.

In operation 403, the computing cluster 201 for processing product manufacturing messages is configured to monitor a second product manufacturing message by polling, wherein the second product manufacturing message is not related to the registration information. The product manufacturing message service device 103 can use the same port to broadcast the first product manufacturing message and the second product manufacturing message, and may also use different ports to broadcast the first product manufacturing message and the second product manufacturing message. No limitation will be given here in the present disclosure. Optionally, the second product manufacturing message may include information that is not related to the content of the registration information, for example, the temperature, the humidity, and the like of the current factory environment. Of course, the second product manufacturing message may be a lot-product manufacturing message and may also be a single-product manufacturing message.

In operation 404, the computing cluster 201 for processing product manufacturing messages determines whether the second product manufacturing message includes product manufacturing keyword. If the second product message includes the product manufacturing keyword, in operation 405, the computing cluster 201 for processing product manufacturing messages keeps the second product manufacturing message. If the second product manufacturing message does not include the product manufacturing keyword, in operation 406, the computing cluster 201 for processing product manufacturing messages discards the second product manufacturing message.

The registration of the computing cluster 201 for processing product manufacturing messages to the product manufacturing message service device 103 may require more processes, such as configuration and verification by relevant personnel. However, in the factory, products may be continuously adjusted and updated. In addition, some devices (some AOI devices) may be unable to be registered to the product manufacturing message service device 103. Thus, the computing cluster 201 for processing product manufacturing messages may also monitor messages which are not related to the registration information. For example, the messages which are not related to the registration information may be monitored by polling. Product manufacturing keywords, which are not related to the registration information but related to product defect identification, detection and analysis, are stored in the product manufacturing keyword list. When receiving the second product manufacturing message, the computing cluster 201 for processing product manufacturing messages can analyze fields in the second product manufacturing message, compare these fields with the product manufacturing keyword list, and keep the second product manufacturing message containing any product manufacturing keyword in the list. For example, supposing that relevant personnel finds that the product defects in the screen produced in the last few lots are likely to be caused by excessive environmental humidity, relevant personnel can add the keyword "environmental humidity" in the product manufacturing keyword list. Subsequently, when receiving messages related to environmental humidity, the computing cluster 201 for processing product manufacturing messages can keep the messages so as to facilitate the analysis of the relevant personnel. When excluding the influence factors such as environmental humidity, relevant personnel can remove the keyword related to environmental humidity in the product manufacturing keyword list, so as to reduce redundant information stored in the computing cluster 201 for processing product manufacturing messages and improve the message processing efficiency of the computing cluster 201 for processing product manufacturing messages. In the whole process of acquiring environmental humidity information, the computing cluster 201 for processing product manufacturing messages does not need to register to the product manufacturing message service device 103, thereby reducing the process of processing the product manufacturing message.

By adoption of this mechanism, the computing cluster 201 for processing product manufacturing messages can preferentially monitor registered information, and meanwhile, filter non-registered information according to the product manufacturing keyword. The computing cluster 201 for processing product manufacturing messages not only monitors the registered information but also can monitor messages sent by all the product manufacturing message service devices 103, thereby improving the expandability of the system.

In the monitoring and broadcasting process of the product manufacturing message, the factory manufacturing system has a high requirement for the processing of the product manufacturing messages. Optionally, to avoid message loss, the computing cluster 201 for processing product manufacturing messages may also have the functions of message cache and message queue. The computing cluster 201 for processing product manufacturing messages can cache the product manufacturing messages in RabbitMQ for message queue management to avoid the problem of message loss caused by delay or other abnormities.

In at least one embodiment of the present disclosure, the first product manufacturing message includes a lot-product manufacturing message, and the second product manufacturing message includes a single product manufacturing message. Therefore, the computing cluster 201 for processing product manufacturing messages can be configured to monitor the lot-product manufacturing message by interrupt and monitor the single product manufacturing message by polling.

As described above, in industrial production, multiple products are combined into one LOT, and the same LOT is subjected to the same processing process, so as to facilitate the recording and sorting of the product manufacturing messages. One lot-product manufacturing message refers to the a collection of product manufacturing messages of multiple products of the same LOT, and one single product manufacturing message refers to product manufacturing messages of a single product (such as GLASS).

In the product manufacturing process, LOT is usually taken as a unit for the recording and transmission of manufacturing messages, which can improve the efficiency of message processing. But in the process of the product defect analysis task, registration information related to the lot-product manufacturing messages may be set on the product manufacturing message service device 103 in advance. In this way, the computing cluster 201 for processing product manufacturing messages monitors the lot-product manufacturing messages by interrupt, so as to improve the efficiency of receiving and processing messages. But the lot-product manufacturing messages are only be sent to the computing cluster 201 for processing product manufacturing messages after a lot of products is completely processed, and this period may cause certain devices (such as the computing cluster 202 for identifying product defect) of the product defect detection analysis system to be in idle state. Therefore, the computing cluster 201 for processing product manufacturing messages may also monitor the single product manufacturing messages by polling in gaps of interrupt, and process the single product manufacturing messages in time. Thus, the processing of most single product manufacturing messages of this LOT may have been completed when receiving a lot-product manufacturing message, thereby improving the message processing efficiency of the computing cluster 201 for processing product manufacturing messages. A single product may be one product in a lot of products and may also be not one of the lot of products. If the single product is one product in the lot of products and a lot-product manufacturing message for the lot is received, other single-product manufacturing messages related to the lot of products monitored subsequently by polling may not be processed or monitored, thereby further improving the message processing efficiency of the computing cluster 201 for processing product manufacturing messages.

Optionally, the monitored product manufacturing messages may be product manufacturing messages generated by the image acquisition device 102 or product manufacturing messages obtained by the product manufacturing message service device 103, and may also be product manufacturing messages (such as generation messages of product image data) generated in the product image database 203. No limitation will be given here in the present disclosure.

Figure 5:
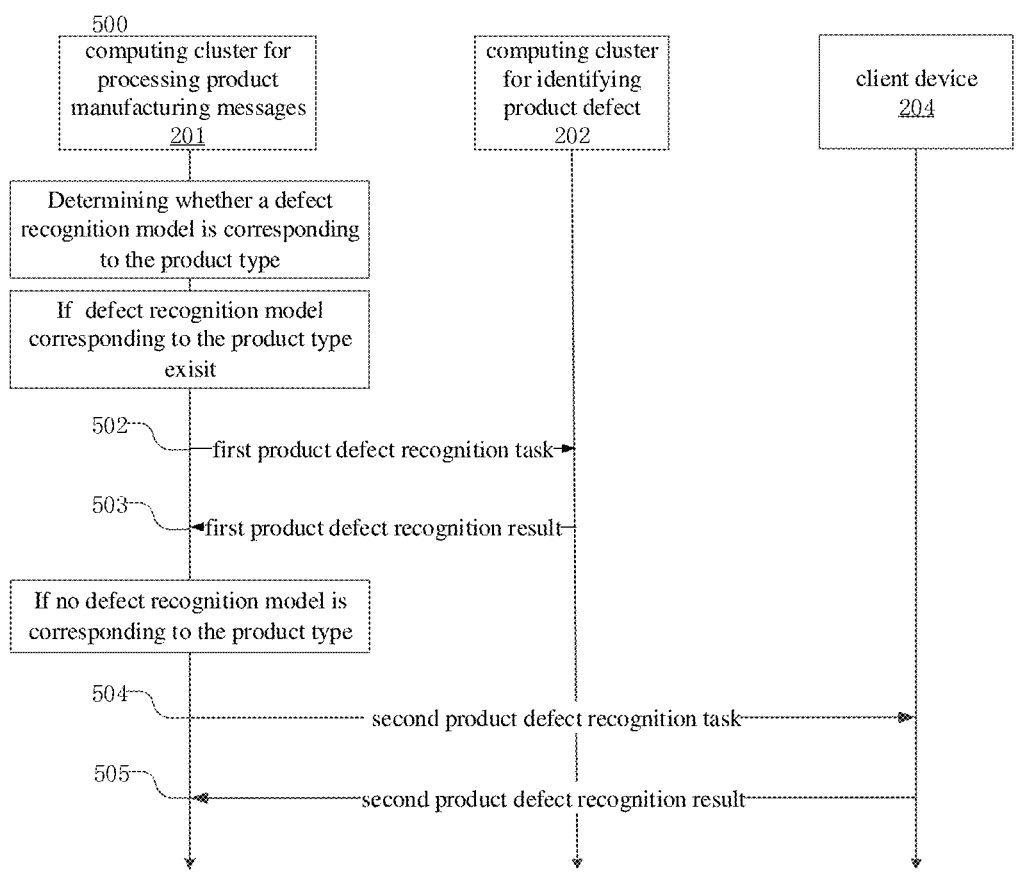
FIG. 5 is a schematic diagram of a method for sending a product defect task in accordance with at least one embodiment of the present disclosure.

FIG. 5 is a schematic diagram of a method 500 for sending product defect tasks in accordance with at least one embodiment of the present disclosure.

As shown in FIG. 5, optionally, the case that the computing cluster 201 for processing product manufacturing messages generates the product defect analysis tasks according to the product messages also includes the operations 501 to 505.

In some embodiments of the present disclosure, the process of generating the product defect analysis tasks according to the product manufacturing messages includes: determining whether a defect identification model is corresponding to the product type according to the product manufacturing message; generating a first defect identification task and sending the first defect identification task to the computing cluster 202 for identifying product defect if a defect identification model is corresponding to the product type; and generating a second defect identification task and sending the second defect identification task to the client device 204 if no defect identification model is corresponding to the product defect type.

At operation 501, whether a defect identification model is corresponding to the product type is determined according to the product manufacturing message.

The defect identification task of the computing cluster 202 for identifying product defect based on the defect identification model is substantially AI-based visual identification, and the defect identification model needs to be trained. In the manufacturing process of the factory, different types of products may be produced, or the defects of the same type of products may be changed due to the adjustment of process parameters. Thus, the defect identification model may be unable to identify the product defects. Therefore, the computing cluster 201 for processing product manufacturing messages needs to determine that whether the computing cluster 202 for identifying product defect is able to identify the product defects according to the product manufacturing messages, so as to generate corresponding product defect analysis tasks. If the computing cluster 202 for identifying product defect is not able to identify the product defects, the product defect analysis task is sent to the client device, and then the manual identification is performed by a user based on the product images displayed by the client device. Thus, the product defect analysis task includes the firsts defect identification task and the second defect identification task, wherein the first defect identification task is a task that performs defect identification based on AI, and the second defect identification task is a task that performs detect identification based on manual work.

For example, the computing cluster 201 for processing product manufacturing messages analyzes the obtained product manufacturing message, obtains the product type, determines whether a defect identification model is corresponding to the product type, and then generates a corresponding product defect analysis task.

If the product type is a known product type (namely trained product) and it is determined that a defect identification model is corresponding to the product type, and the defect task analysis can be executed based on the defect identification model corresponding to the product type. Thus, a first defect identification task is generated and send to the computing cluster for identifying product defect.

If the product type is an unknown product type (namely untrained product) and it is determined that no defect identification model is corresponding to the product type, manual identification is required. Thus, a second defect identification task is generated and send to the client device.

If the product type is known product type, but the product defect content cannot be identified based on the defect identification model corresponding to the product type (for example, the identification score is lower than the preset threshold), it may also be determined that no defect identification model is corresponding to the product type. If the performances of the defect identification model are insufficient to satisfy the defect analysis task (e.g., the accuracy and the recall are lower than the preset threshold) corresponding to the product type, it may also be determined that no defect identification model is corresponding to the product type. The computing cluster 201 for processing product manufacturing messages may also determine whether a defect identification model is corresponding to the product type by other means such as manual determination and defect identification model prejudgment. No limitation is given in the present disclosure to how the computing cluster 201 for processing product manufacturing messages determines whether a defect identification model is corresponding to the product type.

If a defect identification model is corresponding to the product type, at operation 502, a first defect identification task is generated and sent to the computing cluster 202 for identifying product defect by the computing cluster 201 for processing product manufacturing messages.

The computing cluster 201 for processing product manufacturing messages may send the first product defect identification task by sending a first product defect analysis request message. The first product defect analysis request message includes the product type, the storage address of product images, the quantity of product images, and the task identifier for defect identification on the defect identification model (the task identifier indicates the utilization of the storage address of the product images and the quantity of the product images to perform defect identification on the product images of the product type). After the computing cluster 202 for identifying product defect receives the first product defect analysis request message (that is, receives the first product defect identification task), product images for defect identification from the product image database 203 are obtained on the basis of the storage address of the product image in the first product defect analysis request message. The defect identification model corresponding to the product type is loaded according to the product type, and defect identification on the product images is performed on the basis of the defect model. As the products and the sites are numerous and the loading time of the defect identification model is long, the computing cluster 202 for identifying product defect may load the defect identification model in advance by default. After the settings are changed, the computing cluster 202 for identifying product defect may also utilize an independent background server to complete the loading of the model, so as to avoid the time consumed by the process of loading the model when the product changes, thereby improving the overall efficiency. As the production-line may generate a large number of images every day for the detection work of the defect identification model algorithm, the computing cluster 202 for identifying product defect can also perform reasonable scheduling and allocation on GPU resources, thereby improving the use efficiency of hardware resources.

After the computing cluster 202 for identifying product defect finishes the first product defect identification task of the product image, at operation 503, the computing cluster 202 for identifying product defect sends the first defect identification result to the computing cluster 201 for processing product manufacturing messages. The first defect identification result includes one or more of defect type, defect position, and defect size.

Optionally, the computing cluster 201 for processing product manufacturing messages may also monitor the reasoning performance of the product defect identification model. The reasoning performance is, one or more of accuracy, precision, recall, FScore, and speed of the first product defect identification task that is processed by the computing cluster 202 for identifying product defect based on the product defect identification model. Wherein, the speed may indicate the speed of the computing cluster 202 for identifying product defect in identifying the product defect of the product images (which may be measured in terms of the quantity of product images/sec, etc.). The accuracy can be calculated by the following formula (1). The precision can be calculated by the following formula (2). The recall can be calculated by the following formula (3). Subsequently, the FScore is calculated by the following formula (4).

$$\text{Accuracy} = \frac{(TP+TN)}{(TP+FP+TN+FN)}; \quad (1)$$

$$\text{Precision} = \frac{TP}{(TP+FP)}; \quad (2)$$

$$\text{Recall} = \frac{TP}{(TP+FN)}; \quad (3)$$

$$FScore = \frac{\left[(1+\beta^2)\cdot \text{Precision}\cdot \text{Recall}\right]}{(\beta^2 \cdot \text{Precision} + \text{Recall})}. \quad (4)$$

Wherein, True-Positive (TP) indicates that the calculation result is positive and the actual result is also positive, that is, the calculation result obtained after the reasoning calculation of defect identification model is A (herein, A represents one result), and the actual result is also A. At this point, the calculation result is consistent with the actual result.

False-Positive (FP) indicates that the calculation result is positive and the actual result is negative, that is, the calculation result obtained after the reasoning calculation of the defect identification model is A but the actual result is not A. At this point, the calculation result is inconsistent with the actual result.

False-Negative (FN) indicates that the calculation result is negative and the actual result is positive, that is, the calculation result obtained after the reasoning calculation of the defect identification model is not A but the actual result is A. At this point, the calculation result is inconsistent with the actual result.

True-Negative (TN) indicates that the reasoning calculation result is negative and the actual result is also negative, that is, the calculation result obtained after the reasoning calculation of the defect identification model is not A and the actual result is also not A. At this point, the calculation result is consistent with the actual result.

In the manufacturing process of the factory, the background of the product circuit is complex and diverse. Many product defects can be easily confused. And the production plan of the product may also be adjusted according to product orders. These factors bring great challenges to model performances. Product change, process change, or product image adjustment may cause the performance of the AI defect identification model to deteriorate. The computing cluster 201 for processing product manufacturing messages may monitor the performances of the defect identification model at a fixed period or in real-time. If the performances of the product defect identification model cannot satisfy production needs, adjustment is made in real-time. For example, the computing cluster 201 for processing product manufacturing messages may give alarm in time if there is a problem, and execute the deployment and confirmation of a new defect identification model.

The computing cluster 201 for processing product manufacturing messages may monitor the accuracy, the precision, the recall, the FScore, and the like of the first product defect identification task, processed by the computing cluster 202 for identifying product defect on the basis of the product defect identification model, by the following three methods. It should be understood by those skilled in the art that the following three methods are only examples, and the computing cluster 201 for processing product manufacturing messages may also monitor the product defect analysis tasks by other methods, as long as any of the accuracy, the precision, the recall or the FScore in processing the product defect analysis tasks can be obtained.

First method: monitoring through a standard data sample

The standard data sample may be pre-stored in the product image database 203. The standard data sample may be examined and verified by senior factory operators and senior inspectors to determine that the selection range (for example, the defect type, the defect number, the defect distribution, etc.) of the sample is kept consistent with a training sample of the defect identification model. Subsequently, the computing cluster 201 for processing product manufacturing messages may compare the reasoning result through the defect identification model with the manually set standard result, and then perform statistics on the accuracy, the precision, the recall, or the FScore of the defect identification model. Meanwhile, the computing cluster 201 for processing product manufacturing messages may also be configured to update the standard sample data according to the time period, production status, manual adjustment mode, etc.

Second method: monitoring through an online sampling model

In the production process of the factory, a plurality of (for example, 3) superior inspectors may perform a random inspection on the product defects. For example, these superior inspectors may extract a plurality of product defect images (for example, 100 product defect images) as for a certain product defect, and then perform manual judgment and mark on the product defect. Subsequently, the plurality of inspectors may utilize the above-marked product defect to respectively and independently recheck the result of the defect identification model performing reasoning on the same sample. After the end of rechecking, voting may be performed on the reasoning result by the plurality of inspectors against the same product defect, and the highest voted result may be taken as a standard result. Subsequently, the standard result is compared with the reasoning result of the defect identification model to monitor the accuracy, the precision, the recall, or the FScore of the defect identification model.

Third method: monitoring by extracting product lots

A plurality of (for example, 3) superior inspectors may extract the AI defect identification model to recheck the reasoning result of the product defects of the entire lot (for example, one LOT, wherein one LOT may include 20 Glass, and each Glass may include 50 to 300 product defects). The product manufacturing message processing device 603 obtains the rechecking result and determines the accuracy, the precision, the recall, or the FScore of the AI defect identification model according to the rechecking result.

In the manufacturing process of the factory, the computing cluster 201 for processing product manufacturing messages may also monitor the usage efficiency of computer resources for the defect identification model, including the usage of memory, video memory, and the like, so as to determine whether GPU resources are abnormal, etc. The computing cluster 201 for processing product manufacturing messages can be configured to allocate tasks according to the load status of the GPU in the computing cluster 202 for identifying product defect, and preferentially allocate the defect identification task or the model training task to a GPU with low load for reasoning or training task. If the reasoning work of defect identification cannot be completely finished by using almost all the computer resources, at this point, hardware resources and the like may be required to be dynamically added.

If no defect identification model is corresponding to the product type, at operation 504, the second defect identification task is generated and sent by the computing cluster 201 for processing product manufacturing messages to the client device 204. The computing cluster 201 for processing product manufacturing messages may send the second product defect identification task by sending a second product defect analysis request message. The second product defect analysis request message includes the product type, the storage address of product images, the quantity of product images, and the task identifier for defect identification on the defect identification model (the task identifier indicates that displaying the product images of this product type (using the storage address of the product images and the quantity of the product images) and preforming manual identification of product defect on those product images). The client device 204 receives the second product defect analysis request message. That is, after the second product defect identification task is received, product images to be subjected to defect identification is obtained from the product image database 203 based on the storage address of the product images in the second product defect analysis request message by the client device 204. The product images are displayed through a display of the client device for manual defect identification.

After the user finishes the manual defect identification task, the client device 204 obtains manual identification defect result. At operation 505, the second defect identification result is sent from the client device 204 to the computing cluster 201 for processing product manufacturing messages. The second defect identification result includes one or more of defect type identification label, defect position label, and defect size label.

The computing cluster 201 for processing product manufacturing messages may also be configured to monitor the status of manual resources for defect identification. For example, in the manufacturing process of the factory, there may be cases where the pending tasks cannot be processed in time due to the low work efficiency of the operators, or some important alarm information not being processed by the operators in time. These cases may bring great loss to production. Thus, the computing cluster 201 for processing product manufacturing messages may also be configured to monitor the status of the client device 204 for the manual identification of the product defect content. For example, the product manufacturing message processing device 603 may be configured to monitor the speed of the manual processing of the product defect analysis task pushed to the client device 204 (for example, monitoring whether the operator performs manual identification on the product images at normal speed), and determine the working efficiency and the working status of the operators, thereby optimizing the task allocation of product defect identification/detection in combination with the scheduling plan.

The computing cluster 201 for processing product manufacturing messages may also be configured to monitor the production status in the factory system. In the product defect detection process, large-scale defect aggregation may occur. The computing cluster 201 for processing product manufacturing messages may be configured to match the product defect information with the sections or process-departments that handle the product defect in the factory, and send alarm information in time to the client devices 204 of these departments. If the product defect requires the corresponding department to perform process or production adjustment on the defect, the computing cluster 201 for processing product manufacturing messages may be configured to monitor the alarm information and the state of the alarm being processed in real-time. Moreover, in the event of a serious alarm not handled in time, the computing cluster 201 for processing product manufacturing messages may be configured to automatically update the alarm information, and meanwhile, send the updated alarm information to the client device 204 of the higher-level department to urge the corresponding department to pay attention to and process the alarm information in time.

Figure 6:
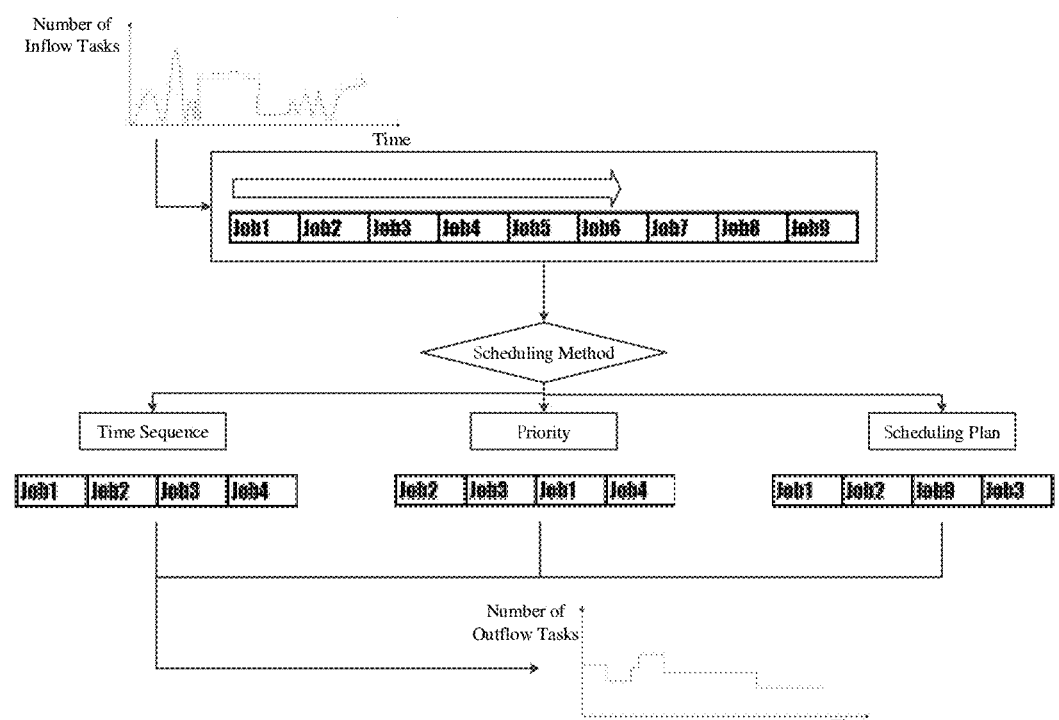
FIG. 6 is a schematic diagram illustrating the process in which a computing cluster for processing product manufacturing messages schedules product defect analysis tasks in accordance with at least one embodiment of the present disclosure.

FIG. 6 is a schematic diagram illustrating the process in which the computing cluster 201 for processing product manufacturing messages provided by at least one embodiment of the present disclosure schedules the product defect analysis tasks.

As shown in FIG. 6, the computing cluster 201 for processing product manufacturing messages is configured to: create a product defect analysis task queue by sorting the product defect analysis tasks based on any one or more of the time sequence of generating the plurality of product defect analysis tasks, the priority order of products, and the product scheduling plan.

Wherein, the sorting of the product defect analysis tasks based on the time sequence of generating the plurality of product defect analysis tasks is to facilitate scheduling according to time sequence. That is to say, the corresponding hardware resource match is processed according to the sequence of the monitored product manufacturing messages entering the queue to be processed. As shown in FIG. 6, supposing that 9 product manufacturing messages are received in turn and 9 product defect analysis tasks Job1 to Job9 are created on this basis, the 9 tasks can be arranged according to the receiving sequence. The method of sequential scheduling is simple to set, and can be better matched in time with the production plan.

The sorting of the product defect analysis tasks based on the priorities of the products includes scheduling according to the set product priorities, that is, sorting according to the priorities of the products in the production plan. The entire scheduling message queue is a dynamic scheduling process, and products with high priorities may be inserted into front positions of the product defect analysis task queue. As shown in FIG. 6, supposing that the priorities of Job2 and Job3 are higher than those of Job1, Job2 and Job3 may be arranged before Job1 for processing. The scheduling based on priority can preferentially ensure the smooth completion of the detection task of the products with high priority.

The sorting of the product defect analysis task based on the product scheduling plan may allow users to be able to specify corresponding scheduling plan, and meanwhile, support temporary insertion and adjustment of the scheduling plan. For example, as shown in FIG. 6, Job9 is temporarily inserted between Job2 and Job3. Thus, the users can focus on monitoring and verifying certain products or defects, and at the same time, can integrate information on other production-lines to temporarily intervene in the work of the entire production-line.

Some embodiments of the present disclosure can combine any one or more of the above three methods to sort the product defect analysis tasks to create the product defect analysis task queue.

Optionally, the computing cluster for processing product manufacturing messages is also configured to: control the sending speed of the product defect analysis tasks in the product defect analysis task queue according to the load status of the computing cluster 202 for identifying product defect.

As shown in FIG. 6, as the frequency and the quantity of inflow products to the site 101 are uncertain, inflow products that need to be detected sometimes suddenly become many, and sometimes become very few. The quantity of inflow tasks over time can be shown in an inflow task number graph. If not scheduled, the detection and analysis work of the computing cluster 202 for identifying product defect will sometimes be over-stressed and sometimes relatively idle, so the processing efficiency of the product defect analysis tasks can be low. The product defect analysis task queue is disposed in the computing cluster 201 for processing product manufacturing messages and provides a time buffer between the production of the product images by the image acquisition device and the performing of the product defect analysis tasks by the computing cluster 202 for identifying product defect.

The product defect analysis tasks in the product defect analysis task queue include tasks to be subjected to product defect analysis. The product manufacturing message processing device can control the sending speed of tasks in the product defect analysis task queue according to the load status of the computing cluster 202 for identifying product defect. If the quantity of the product manufacturing messages is greater than the preset threshold, and/or the quantity of tasks in the product defect analysis task queue is higher than the preset threshold, and/or the load of the computing cluster 202 for identifying product defect is greater than the preset threshold, the task sending speed is reduced. If the quantity of the product manufacturing messages is less than the preset threshold, and/or the quantity of tasks in the product defect analysis task queue is less than the preset threshold, and/or the load of product manufacturing assistant device is less than the preset threshold, the task sending speed is increased. As shown in FIG. 6, the quantity of outgoing tasks remained more or less even over time after scheduling (as shown by an outflow task number graph).

The computing cluster 201 for processing product manufacturing messages may also control the sending speed of the product defect analysis tasks in the product defect analysis task queue to the client device 204 according to the load status of the client device 204. If there are a plurality of client devices, the corresponding speed of sending the defect analysis tasks to different client devices is also controlled according to the speed of the client devices in processing the product defect analysis tasks (manual identification of the defect tasks). For example, if the speed of a certain client device (e.g., 204-1) in processing the product defect analysis tasks is lower than the speed of another client device (e.g., 204-2) in processing the product defect analysis tasks, the task sending speed to the client device 204-1 is reduced. If the speed of a certain client device (e.g., 204-1) in processing the product defect analysis tasks is higher than the speed of another client device (e.g., 204-2) in processing the product defect analysis tasks, the task sending speed to the client device 204-1 is increased. The embodiments of the present disclosure can perform reasonable scheduling and allocation on the analysis tasks of various products, and then perform reasonable allocation on computing resources and tasks, and meanwhile, satisfy the needs of actual production at maximum efficiency.

Figure 7:
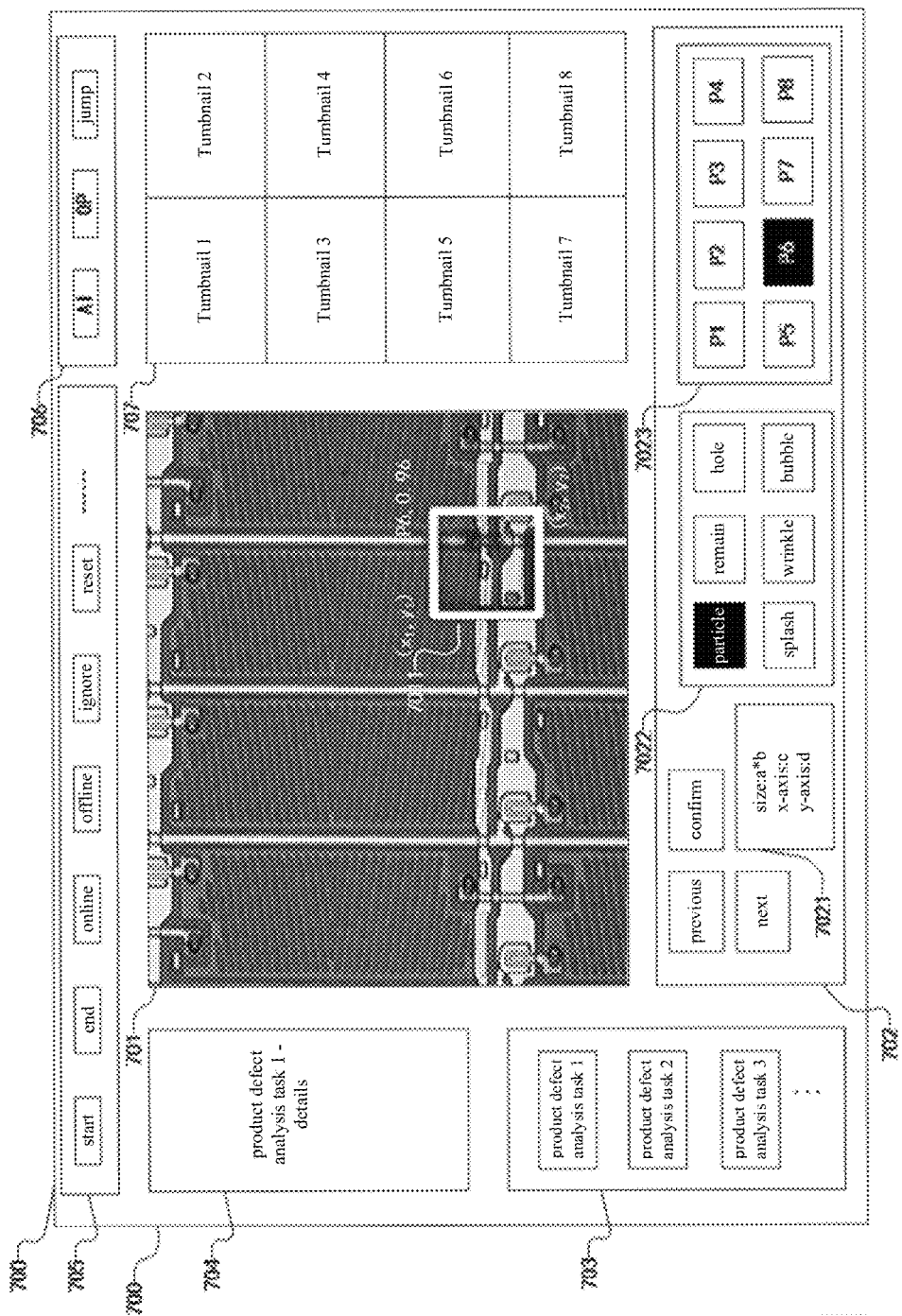
FIG. 7 is a schematic diagram of a graphical user interface (GUI) of a client device in the distributed computing system for product defect analysis provided by at least one embodiment of the present disclosure.

FIG. 7 is a schematic diagram of a GUI 700 of the client device 204 in the distributed computing system 104 for product defect analysis provided by at least one embodiment of the present disclosure.

The client device 204 includes a display. The display may be configured to display the GUI 700 which is used for human-computer interaction. The GUI may include windows, icons, scroll bars, and any other GUI objects used by the user to enter commands into the device. It should be understood that the exemplary embodiments of the present invention may include various GUIs of various shapes, designs, and structures.

Exemplary human-computer interaction includes: adjusting the position and/or size of one or more GUI objects, or activating buttons, or opening a file/application represented by a GUI object, and associating metadata with one or more GUI objects, or manipulating the GUI in other ways. The exemplary GUI includes digital images, videos, text, icons, and control elements such as buttons and other graphics. In some cases, the users will need to perform such manipulation on GUI objects in related applications.

Optionally, the client device 204 may be configured to generate one or more of a product image area 701, a shortcut function area 702, a task list area 703, a task details area 704, an operation function area 705, a task selection area 706, and a thumbnail area 707, and display these areas on the GUI 700 of the display.

Optionally, the display is configured to display product images of which the product defects are identified by the computing cluster for identifying product defect. The product image contains a product defect content label. The product defect content label includes: defect mark box, defect mark box coordinate, defect category label, and defect category score. The product images of which the product defects are identified by the computing cluster for identifying product defect may be displayed in the product image area 701. The product image containing the product defect content label is a product image obtained by the computing cluster 202 for identifying product defect based on the first defect identification task. After the computing cluster 202 for identifying product defect identifies the defect content (defect type, position, and size) of the product image, the defect content is automatically labeled on the product image and displayed through the display.

For example, a square/circle is used in the product image to circle the defective part of the product (for example, a white square 7011 in FIG. 7), vertex coordinates (x1, y1) and (x2, y2) of the square are marked out to show defect position and size. Moreover, the text is labeled near the square to indicate the defect type (for example, P6 above the white square 7011 in FIG. 7) and the defect type score (for example, 0.96 above the white square 7011 in FIG. 7).

The defect type label, the defect coordinate and size, and the product defect score may also be displayed in detail in other components (e.g., the current processing task box 801) in the GUI 700. No limitation will be given here in the present disclosure. The display displays the product images of which the product defects are identified by the computing cluster for identifying product defect, so that users can intuitively view and recheck the defect identification effect of the computing cluster 202 for identifying product defect, to ensure the accuracy of AI identification. The defect type score represents the probability of AI identifying the defect type correctly. By the display of the defect type score, the user can perform more targeted rechecking on defect identification results with a low score.

The display is also configured to display product images of which product defects cannot be identified by the computing cluster for identifying product defect, namely product images not containing defect content label. The product images which product defects cannot be identified by the computing cluster for identifying product defect include product images for product defect identification to be processed by the second defect identification task, and also include product images of which the defect type score after identification by the product defect cluster is lower than a certain threshold. In industrial production, in order to ensure the smooth progress of the technological process, the accuracy of the defect analysis model is required to be very high. Thus, if the computing cluster 202 for identifying product defect cannot identify the product defects or the identification score (identification probability) is low, all product images are pushed to the client device 204 for manual identification to ensure the accuracy of defect identification. Thus, if the computing cluster for identifying product defect cannot identify product defect of a product image, the product image may not be labeled, and the product image not labeled with product defect content label is displayed in the product image display area 701.

The client device 204 is configured to obtain a product defect identification instruction inputted by the user, and display the product defect content label of the product image that cannot be identified by the computing cluster 202 for identifying product defect based on the product defect identification instruction.

The client device 204 is configured to generate the shortcut function area 702, and the display is configured to display shortcut function buttons. The shortcut function buttons are disposed in the shortcut function area 702. The shortcut function buttons may include basic function buttons "Previous", "Next", "Confirm" and other buttons to realize the switching of product images, and also include buttons for editing of the coordinate and the size of the defect box by a defect position mark area 7011 to realize the edit of the defect position mark box, and may also include product defect type setting buttons (such as "Particle", "Remain", "Hole", "Splash", "Fold" and "Bubble" in a defect main category setting area 7022, and buttons "P1", "P2", "P3" and the like in corresponding defect subclass setting area 7023). The labeling of the defect type of the product image is realized by the shortcut buttons. Optionally, the shortcut function area 702 may also set shortcut keys for the product defect types, so as to omit multiple defect type setting buttons in the shortcut function area 702. The client device 204 may also be configured to capture the mouse position in real-time and transform the mouse position into the specific position and size on the product image. The user can utilize the mouse to draw the position and the size of the product defect in the product image. The client device can be configured to obtain the product defect identification instruction inputted by the user based on the shortcut function area 702 or other means, so as to realize the manual labeling of the product defect content based on the product defect identification instruction, thereby displaying the product defect content label of the product image that cannot be identified by the computing cluster for identifying product defect.

The client device 204 is also configured to obtain a product defect rechecking instruction inputted by the user, and determine or modify the product defect content label in the product image based on the product defect rechecking instruction. The product defect content label in the product image to be rechecked may be obtained by being identified by the computing cluster for identifying product defect 201 and may also be obtained by manual identification. For example, the product defect content identification based on AI can efficiently complete the category labeling of the products. But due to the complex process of the production-line and with the improvement of the technological process, the identification effect of the defect identification model may fluctuate. Thus, regular rechecking by experienced staff is required to ensure the accuracy and the stability of AI identification. Moreover, for example, the product defect content label after manual identification performed by junior staff may be rechecked by the experienced staff again, so as to ensure the accuracy of manual labeling of the junior staff. Therefore, the relevant function applications of product defect identification rechecking for users are provided by the client device 204.

For example, the user may select the type of the product image to be rechecked in the client device 204. The type of the product image to be rechecked includes product images of which the product defects are identified by the computing cluster 202 for identifying product defect based on the defect identification model and product images of which the product defects are identified manually. The product images to be rechecked are displayed in the product image area 701.

For example, a particle defect P6 in the product image to be rechecked is identified to be a particle defect P2 by error. The user can click/touch a product defect type setting button "P6" in the shortcut function area 702. The client device can obtain the product defect rechecking instruction inputted by the user. The defect type label P2 can be modified into P6 in the product image containing the product defect identification content based on the rechecking instruction. Thus, the product defect content in the product image to be rechecked is modified.

Supposing that the product content label in the product image to be rechecked is completely correct, the client device can obtain the product defect rechecking instruction inputted by the user by clicking/touching the basic function button "Next" or "Confirm" in the shortcut function area 702. And the product defect content in the product image to be rechecked is confirmed, so that the product image in the product image area 701 is jumped to the next product image to be rechecked.

Supposing that it is not correct that position or size of the defect position mark box identified by the defect identification model, defect position adjustment can be made by inputting position or size information of the defect position mark box in a defect position mark area 7021. The user can also select the position and the size of the product defect by click and drag by mouse. The client device 204 can capture the mouse position in real-time and transform the mouse position into the specific position and size on the product image. The user may also directly draw a new defect position mark box on the product image containing the product defect identification content in the product image area 701 to replace the old defect position mark box. The client device 204 may also be configured to obtain the product defect rechecking instruction by other input modes (such as keyboard shortcut setting) used by the user. No limitation will be given here in the present disclosure.

The display may also be configured to display a task list corresponding to a plurality of product defect analysis tasks. The client device 204 may display the plurality of product defect analysis tasks generated by the computing cluster 201 for processing product manufacturing messages in the task list area 703 in the form of a name list. The sorting of these product defect analysis tasks may be changed according to set rules. For example, the topmost product defect analysis task is the currently processed task—the product defect analysis task 1. Beginning from the second product defect analysis task, the remaining product defect analysis tasks are automatically sorted according to the product priority and the time priority. Each product defect analysis task name in the task list area 703 may represent a set of a plurality of product defect analysis tasks of the same lot of products, and may also represent a product defect analysis task of a single product (glass). The task name may include the serial number of the lot or the single product and may also include the product type, etc. No limitation will be given here. In the product manufacturing process, as the product continuously passes through various sites, the plurality of product defect analysis tasks will be generated in real-time. The quantity of the name lists in the task list area 703 may be continuously increased; and the arrangement order of the tasks may also be continuously changed due to the factors such as priority.

The display is also configured to display the task details of the current product defect analysis task. The task details may be displayed in the task details area 704. For example, the current processing product defect analysis task is the product defect analysis task 1. The task details include product information, site information, defect type information, etc. The defect type information may be obtained by identification through the defect identification model. The user may also click any list name in the task list area 703, and detailed information of the task will be shown in the task details area 704. If one product defect analysis task name contains the plurality of product defect analysis tasks of a lot of products, the task details area 704 may also display the task details of every single product one by one.

The client device 204 may also be configured to obtain an execution priority adjustment instruction of the plurality of product defect analysis tasks inputted by the user, and the sorting of the product defect analysis tasks in the task list is modified based on the adjustment instruction. The user may input the execution priority adjustment instruction for the plurality of product defect analysis tasks to the client device 204 by touch operation, mouse operation, keyboard operation, etc. The client device 204 may also obtain the input of the priority adjustment instruction by other input means. After acquiring the adjustment instruction, the client device 204 may adjust the execution order of the product defect analysis task queue in the computing cluster 201 for processing product manufacturing messages, and may also adjust the order of the client device 204 in executing the product defect analysis tasks. Corresponding modification may also be made to the sorting of the product defect analysis tasks in the task list area 703 displayed by the corresponding client device 204.

For example, suppose that the user hopes to adjust the execution order of the product defect analysis task, the user can drag the product defect analysis task in the task list area 703. For example, after dragging a product defect analysis task 2 in FIG. 7 to a product defect analysis task 3, the priority of the product defect analysis task 2 is adjusted to be lower than the priority of the product defect analysis task 3. The client device 204 can obtain the operation of the user and then obtain the execution priority adjustment instruction of the plurality of product defect analysis tasks. After acquiring the execution priority adjustment instruction, the client device 204 may modify the execution priority of one of the plurality of product defect analysis tasks or the plurality of product defect analysis tasks based on the adjustment order. Meanwhile, the client device 204 may be configured to modified the sorting of the product defect analysis tasks in the task list area 703 based on the adjustment instruction. At this point, the product defect analysis task 3 is displayed above the product task 2.

The user may also directly or indirectly set the priority of the product defect analysis tasks by other means. For example, the user may select the priority of the product defect analysis tasks 2 to 5 to be high by preset priority adjustment shortcut or preset priority adjustment button on the GUI 700. The client device 204 may be configured to obtain the execution priority adjustment instruction of the plurality of product defect analysis tasks through the priority adjustment button. After acquiring the execution priority adjustment instruction, the client device 204 may modify the execution priority of one of the plurality of product defect analysis tasks or the plurality of product defect analysis tasks based on the adjustment instruction. Meanwhile, the client device 204 is configured to modify the sorting of the product defect analysis tasks in the task list area 703 based on the adjustment instruction. For example, the client device 204 may always fixedly display the product defect analysis tasks 2 to 5 at the top of the task list area 703, until the product defect analysis tasks 2-5 are completed. The remaining product defect analysis tasks will continuously be sorted according to the product priority and the time priority beginning from the product defect analysis task 6.

The display is also configured to display multiple thumbnails of a product image device. The thumbnails may be displayed in the thumbnail area 707. The thumbnails in the thumbnail area 707 are only just reduced in size compared with the product images in the product image area 701. Optionally, the product images in the product image area 701 may be enlarged views of the thumbnails 1. The user may click any thumbnail, so that the enlarged product image corresponding to the thumbnail is displayed in a product image area 801. The thumbnail may be the thumbnail of the product image containing the product defect identification content and may also be the thumbnail of the product image not containing the product defect identification content. Multiple thumbnails may be thumbnails of all the product images of a lot of products in the current defect analysis task, may also be thumbnails of all the product images in the single product, and may also be thumbnails of all the product images under the same defect type. Optionally, if the user clicks a certain defect type in the single product in the task details area 704, all the thumbnails under this type are displayed in corresponding thumbnail area 707.

The display is configured to display a plurality of operation function buttons. The operation function buttons are disposed in the operation function area 705. The client device obtains a start/end operation instruction inputted by the user. Based on the start operation instruction, the computing cluster 201 for processing product manufacturing messages begins to send the product defect analysis tasks, or the defect identification results to the client device 204. Based on the end operation instruction, the computing cluster 201 for processing product manufacturing messages stops sending the product defect analysis tasks or the defect identification results to the client device. The client device 204 obtains an online/offline operation instruction inputted by the user. Based on the online operation instruction, the client device 204 may receive the product defect analysis tasks in real-time. Based on the offline operation instruction, the client device 204 does not receive the product defect analysis tasks again, but the user may perform rechecking or manual identification on unfinished product defect analysis tasks stored in the client device 204. The client device 204 may also execute corresponding functions based on other operation function instructions inputted by the user.

The display is also configured to display task selection buttons. The task selection buttons are provided in the task selection area 706. The client device 204 is configured to obtain rechecking task function selection instruction inputted by the user (for example, the user clicks an AI button). The corresponding task details area 704, thumbnail area 707, and product image area 701 display the product images of which the product defects are identified by the computing cluster 202 for identifying product defect, and the product images may be used for the rechecking of the user. The client device 204 is configured to obtain manual identification function selection instruction inputted by the user (for example, the user clicks an OP button). The corresponding task details area 704, thumbnail area 707, and product image area 701 display the product images that not contains the product identification content, and the product images that may be used for manual identification. The client device 204 may also obtain jump function selection inputted by the user, so as to jump the image in the thumbnail area 707 for the sampling rechecking of the user.

Optionally, the display is also configured to display reference information related to at least one product defect analysis task in the plurality of product defect analysis tasks. The reference information includes standard product images and product defect identification standards. The client device 204 may be configured to display product images related to the current processing product defect analysis task 1 in the product image area 701, and display standard product images in a standard product image box (not shown in the figure). The client device 204 may also be configured to display the product defect identification standard in the product defect identification standard box 805. If there are multiple product images, the user may select the product image by the previous/next buttons in the shortcut function area 702. The user may also respectively scale the images in the product image area 701 and the standard product image box by a zooming button set by the client device. Relevant staff can more intuitively determine the product defect content by comparing the product image in the product image area 701 with the standard product image in the standard product image box.

Figure 8:
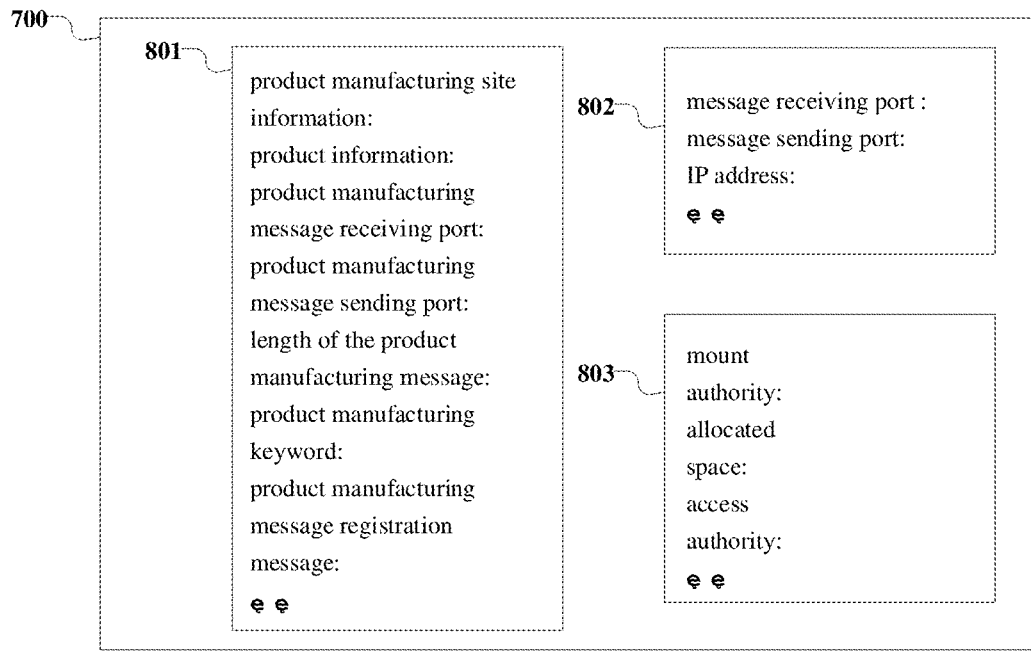
FIG. 8 is another schematic diagram of the GUI of the client device in the distributed computing system for product defect analysis provided by at least one embodiment of the present disclosure.

FIG. 8 is another schematic diagram of the GUI of the client device 204 in the distributed computing system 104 for product defect analysis provided by at least one embodiment of the present disclosure, which illustratively shows another presentation form of the GUI 700.

Optionally, the client device 204 may also generate one or more of a message processing configuration box 801, a system configuration box 802, and a product image database configuration box 803, and display them on the GUI 700.

The client device 204 may be configured to set the receiving and sending of the product manufacturing messages according to the requirement of the site 101. As described above, the computing cluster 201 for processing product manufacturing messages must monitor the product manufacturing messages sent by the product manufacturing message service device 103. Thus, the client device 204 may be configured to set the communication between the computing cluster 201 for processing product manufacturing messages and the product manufacturing message service device 103. More specifically, the client device 204 may show the message processing configuration box 701 in GUI 700. The message processing configuration box 701 shows the following communication settings: product manufacturing site information, product information, product manufacturing message receiving port, product manufacturing message sending port, the length of the product manufacturing message, product manufacturing keyword, product manufacturing message registration information, and product manufacturing message communication protocol. The user may modify the above information by editing options in the message processing configuration box 801.

The computing cluster 201 for processing product manufacturing messages, the computing cluster 202 for identifying product defect, and the client device 204 may be configured to directly perform read/deletion operation on the product images in the product image database 203. Thus, the client device 204 may also be configured to set the communication settings among the computing cluster 201 for processing product manufacturing messages, the computing cluster 202 for identifying product defect, the client device 204, and the product image database 203 (for example, IP address and port number through which the computing cluster 201 for processing product manufacturing messages, the computing cluster 202 for identifying product defect and the client device 204 are connected with the product image database 203).

The client device 204 may also need to set the storage of the product image database 203. Relevant staff may configure the storage of the product image database 203 by editing the content in the product image database configuration box 803. For example, one or more of the storage settings are performed on the product image database 203: mount authority, allocated space, and access authority for shared storage. For example, the access authority of the computing cluster 202 for identifying product defect on the product image database 203 may be set to be "read-only" so as to ensure that the computing cluster 202 for identifying product defect does not delete the product images in the product image database 203 by error.

The client device 204 may also need to set the message receiving port, the message sending port, the communication protocol, the IP address, and the like of the computing cluster 202 for identifying product defect, so that the computing cluster 202 for identifying product defect can receive the product defect analysis tasks distributed by the computing cluster 201 for processing product manufacturing messages. Relevant staff may set the communication details of the computing cluster 202 for identifying product defect by editing the content in the system configuration box 802.

The subsequent business of product manufacturing factory may be also expanded, so there may be adjustments in the business level, computing resources, storage resources, etc. When hardware is added to the factory, the client device 204 may set the added hardware without changing the running state of the existing system. Thus the setting of the original device is not changed.

In view of the complexity of the entire system, different levels of personnel have different authorities.

The client device 204 may be configured to set user group information, information of users in the group, and user authority information. Optionally, the client device 204 is also configured to obtain authority adjustment information of the product defect analysis task; and adjust the authority of the product defect analysis task based on the authority adjustment information. Wherein, the authority adjustment information includes one or more of user group adjustment information, adjustment information of users in the group, and user authority adjustment information.

The user may edit the user group information, the information of the users in the group, and the user authority through the client device 204. And it is also possible to edit user group information to further manage users by group. For example, the user may add, save, and delete the information of the group. The user may manage the users in the group by editing the information of the users in the group (for example, adding, deleting, and editing members of the user group). The user may also set detailed authority according to the requirement of each user. For example, the user may directly edit the user authority of a certain user. The user authority refers to the authority that whether the user can process a certain product defect analysis task, for example, the task for rechecking of the product defect content of the computing cluster 202 for identifying product defect, the task for the communication setting of the computing cluster 201 for processing product manufacturing messages, etc.

The client device 204 may be configured to obtain the edit operation of the user, integrate the operation information into the authority adjustment information of the product defect analysis task, and adjust the authority of the product defect analysis task according to the authority adjustment information.

In the embodiment of the present disclosure, the computing cluster 201 for processing product manufacturing messages is also configured to generate a defect identification model training task. The computing cluster 202 for identifying product defect is configured to train the defect identification model based on the defect identification model training task.

As products and sites are numerous, not all the problems can be solved by utilization of a general-use defect identification model, so multiple defect identification models are required to be provided to evaluate products of different product types. In the manufacturing process of the factory, there may also be a need to fine-tune the defect identification model. For example, if the manufacturing process of the production-line of the factory changes or the manufacturing device changes, the produced AOI images may change. The change may cause the reduction of the reasoning performance of the defect identification model of the production-line of the factory, so the defect identification model must be retrained. Another example is that the production of a new product type may produce defects that are different from those of the original product type, and the original defect identification model is unable to identify defects of that product type.

Thus, when the reasoning performances (accuracy, precision, recall, and FScore) of the defect identification model cannot satisfy requirements or the defect identification model cannot identify the product defects, the computing cluster 201 for processing product manufacturing messages may be configured to generate the defect identification model training task and send the defect identification model training task to the computing cluster for identifying product defect for the training of a new defect identification model. The computing cluster 201 for processing product manufacturing messages may be configured to forward result data of the trained defect identification model to the client device 204. The client device 240 may be configured to display the result data after receiving the forwarded data.

The computing cluster 201 for processing product manufacturing messages may be configured to manage a plurality of trained defect identification models according to sites, products, time nodes, and the like, and configure training, test, and the like of new defect identification models. Each defect identification model can only be used after training, verification, test, and estimation. In the case of limited training defect identification models and computer resources, the computing cluster 201 for processing product manufacturing messages may be configured to perform scheduling and reasonable allocation on the defect identification model training tasks according to the priority, the training number, and the status of hardware resources of the defect identification model training tasks. The scheduling and allocation proposal is similar to that of the product defect analysis task and will not be further described here.

The computing cluster 201 for processing product manufacturing messages may also realize the function of visualizing defect identification model training (the visualizing result of the defect identification model training will be displayed in the client device 204), so that the user can observe the status of the defect identification model training in real-time (for example, whether the training of the defect identification model converges), and whether to stop or adjust the training process. With the continuous enrichment of data sets and the continuous optimization of training parameters, as for the same product defect detection, if the newly trained defect identification model has a better effect than the old defect identification model, the computing cluster 201 for processing product manufacturing messages may also update the defect identification model in a defect identification model library. The computing cluster 201 for processing product manufacturing messages may also send a training task to the computing cluster 202 for identifying product defect and estimate the defect identification model in real-time according to process information (for example, Loss, verification accuracy, etc.) fed back in the training process, to determine whether the training process of the defect identification model is normal.

The computing cluster 201 for processing product manufacturing messages may also be configured to add, delete, modify and edit training sets, verification sets, and test sets required for training. The computing cluster 201 for processing product manufacturing messages may also be configured to deploy the defect identification model according to product requirements, and perform work such as evaluation and testing before deployment. The above implementation of functions related to model training may be implemented by the computing cluster for processing product manufacturing messages, or the model training management function may also be implemented by the independent deployment of a model management device. No limitation will be given here in the present disclosure.

The computing cluster 202 for identifying product defect is configured to obtain product image samples in the product image database 203 based on the received defect identification model training task. The product image samples in the product image database 203 are product images of which the defect content (labeled) has been recognized. Based on parameters and product images, a product defect analysis cluster 1305 is configured to train an AI defect identification model. The computing cluster 202 for identifying product defect may be configured to set special transaction request message format probe (the message body contains "task-Num" key) as HeartBeat, regularly return the task load in corresponding GPU node task queue, set each GPU node to one of three types: trainable/reasonable/trainable and reasonable, and manage the task load on each GPU node in the form of a list. The tasks are pushed to the optimum GPU node in combination with the task type and the task load on the GPU node. The product defect analysis cluster 1305 can be configured to manage the GPU node and complete task scheduling, so as to highly efficiently utilize the GPU resources.

For example, the computing cluster 202 for identifying product defect and the computing cluster 201 for processing product manufacturing messages can be configured to realize the training or reasoning of the defect identification model by the following exemplary means. Firstly, socket network connection is established between the computing cluster 202 for identifying product defect and the computing cluster 201 for processing product manufacturing messages. The computing cluster 201 for processing product manufacturing messages is configured to send transaction request type messages to the computing cluster 202 for identifying product defect through TCP messages. Wherein, the transaction request type messages may have the following seven types identified by type fields, for example, reasoning, training, training status inquiry, terminating the training of a task in advance, inquiring node information (inquiring the unique identification number and type of the current GPU node), clearing tasks in task queue, and inquiring task status. The computing cluster 202 for identifying product defect is configured to analyze the "type" field in the transaction request type message after receiving the message. The product defect analysis tasks with a type of "reasoning" or "training" may take a long time to process. If the "type" field indicates that the product defect analysis task is a type of "reasoning" or "training", the computing cluster 202 for identifying product defect instantiates the task and put the task in the task queue. If the "type" field indicates the remaining five types of the product defect analysis tasks, the computing cluster 202 for identifying product defect instantiates the task and directly calls an execution function to complete the corresponding operation and quickly return the result to the computing cluster 201 for processing product manufacturing messages.

A task manager in the computing cluster 202 for identifying product defect is configured to obtain a reasoning/training task object from the task queue, call the corresponding reasoning/training algorithm, and return the task result in a form of pre-defined TCP message to the computing cluster 201 for processing product manufacturing messages. The computing cluster 202 for identifying product defect is configured to return all the received result messages to the computing cluster 201 for processing product manufacturing messages. The computing cluster 201 for processing product manufacturing messages finally returns the result message to the client device 204. And the client device 204 is configured to analyze the result message for front-end interface display or being stored in the database.

The display of the client device 204 is configured to display the training status of the defect identification model. For example, the computing cluster 201 for processing product manufacturing messages may forward product defect analysis response messages to the client device 204, and then the client device 204 displays the messages on the display and shows the messages to the user. The computing cluster 201 for processing product manufacturing messages may also forward messages related to the training status of the defect identification model to the client device 204, and then the client device 204 displays the messages on the display and shows the messages to the user.

Figure 9:
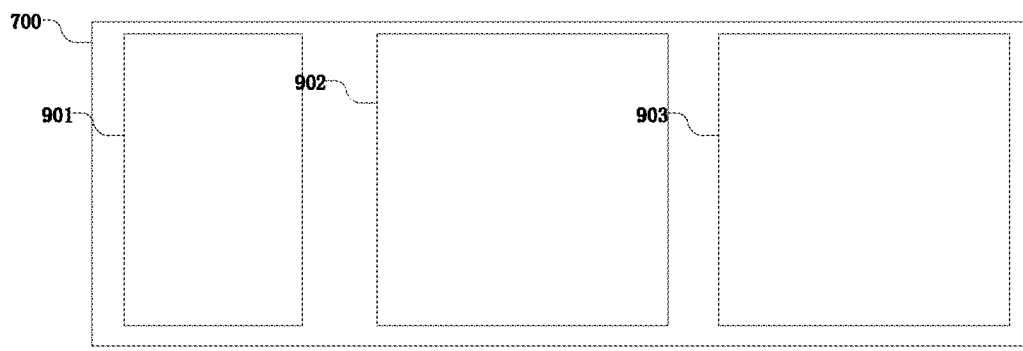
FIG. 9 is still another schematic diagram of the GUI of the client device in the distributed computing system for product defect analysis provided by at least one embodiment of the present disclosure.

FIG. 9 is still another schematic diagram of the GUI 700 of the client device 204 in the distributed computing system 104 for product defect analysis provided by at least one embodiment of the present disclosure.

Optionally, the client device 204 may also generate a model training status box 901 and display the model training status box on the GUI 700. Because the training of the defect identification model is a time-consuming process, if parameters and data settings are unreasonable when the defect identification model starts training, the defect identification model obtained after long-time training may be wrong and inaccurate. In order to avoid discovering the problem at the end of the training, the client device 204 can visually display the training process of the defect identification model, observe in real-time whether the training status of the defect identification model converges, and stop or adjust the training process in time.

Optionally, the client device 204 may also generate a new vs. old model comparison box 902 and display the new vs old model comparison box on the GUI 700. The client device 204 may also be configured to generate a function button box 903. The function button box 903 includes a function key to initiate an offline test, a function key to initiate an online test, and a function key to deploy a new defect identification model.

Supposing that the computing cluster 202 for identifying product defect has trained the new first defect identification model, the user is ready to replace the original second defect identification model with the new first defect identification model.

The user may initiate the offline test of the first defect identification model by clicking the function key to initiate the offline test. A message that the defect identification model requires an offline test may be sent from the client device 204 to the computing cluster 201 for processing product manufacturing messages. A product defect analysis task for offline testing of the first defect identification model is distributed by the computing cluster 201 for processing product manufacturing messages, to obtain an offline test result of the first defect identification model. Supposing that the computing cluster 202 for identifying product defect is using the second defect identification model to analyze the product defects of this type at this point, the computing cluster 202 for identifying product defect may use data generated by reasoning through the second defect identification model as a test set to perform an offline test on the first defect identification model, so as to compare the quality of the first defect identification model and the second defect identification model. At this point, the new vs old model comparison box 902 displays comparison images of the first defect identification model and the second defect identification model. The new vs old model comparison box 902 may also be configured to directly display the product defect content identified by the second defect identification model (the display mode refers to a defect identification model reference box 7011). The user may recheck and mark the product defect content identified by the first defect identification model through the function button box 903. The computing cluster 202 for identifying product defect takes rechecked and marked data as a test set, and the test result (namely the offline test result of the first defect identification model) is similarly displayed in the new vs. old model comparison box 902.

After the offline test of the first defect identification model is completed, the computing cluster 201 for processing product manufacturing messages is configured to obtain the offline test result of the first defect identification model, which indicates the accuracy, the analysis speed, and the like of the first defect identification model in analyzing the product defects. If the offline test result satisfies preset standard (for example, the accuracy of the first defect identification model is greater than the accuracy of the second defect identification model), the user may initiate the online test of the first defect identification model by clicking the function key to initiate the online test. It should be understood by those skilled in the art that the above-preset standard may also include the comparison of any index in the indexes such as recall and FScore. The present standard is not limited in the present disclosure, as long as the preset standard can balance the quality of two defect identification models.

The online test of the first defect identification model may also be referred to as the grayscale release process of the first defect identification model. The computing cluster 202 for identifying product defect may perform an online test on the first defect identification model by using real-time data generated on the production-line of the factory. Both the first defect identification model and the second defect identification model are respectively reasoned using the same real-time data to produce different product defect reasoning results. Relevant staff/distributed computing system 104 for product defect analysis can further be configured to analyze whether the online test result of the first defect identification model satisfies the preset standard (for example, whether the result is superior to the product defect reasoning result generated by the reasoning of the second defect identification model for the same data).

Supposing that the first defect identification model passes the offline test, the computing cluster 201 for processing product manufacturing messages copies the data generated by the production-line in real-time into two copies after reading the data. The two copies are respectively issued to a first product defect analysis node that executes the product defect identification reasoning task of the second defect identification model and a second product defect analysis node that executes the online test of the first defect identification model. The first product defect analysis node and the second product defect analysis node may be different GPU nodes in the computing cluster 202 for identifying product defect and may also be other devices capable of executing the analysis or test of the defect identification model. The first product defect analysis node and the second product defect analysis node may be the same device and may also be different devices. No limitation will be given here in the present disclosure.

After the first product defect analysis node and the second product defect analysis node receive the product defect analysis task for the online test sent by the computing cluster 201 for processing product manufacturing messages, the second product defect analysis node may load the first defect identification model for the online test. The online test of the first defect identification model and the reasoning of the second defect identification model are synchronously performed, and data sources of both are consistent. If the reasoning result of the first defect identification model is superior to the reasoning result of the second defect identification model, it indicates that the real-time processing effect of the first defect identification model satisfies model update requirement, and the first defect identification model can be a good replacement of the second defect identification model.

If the offline test result or the online test result of the first AI defect identification model satisfies the preset standard, the user may deploy a function key of a new defect identification model by click (at this point, the client device 204 obtains the defect identification model adjustment information, and the defect identification model adjustment information indicate that the second defect identification model needs to be replaced by the first defect identification model), so that the computing cluster 201 for processing product manufacturing messages sends a defect identification model replacement request to the computing cluster 202 for identifying product defect. Thus, the second defect identification model in the computing cluster 202 for identifying product defect may be replaced by the first defect identification model.

After the above three operations, the first defect identification model can update the entire process of release through a convenient offline test and high-efficiency visual grayscale release (online test).

The grayscale release and the above process do not affect the real-time reasoning task of the original defect identification model (the second defect identification model) on the production-line. Then the normal production of the production-line is not affected, and large loss caused by a system shutdown and the like would not be happened due to the deployment of the new defect identification model (the first defect identification model) by traditional manual test. Moreover, test data used in the grayscale release process is a result after the rechecking of the user in the client device 204 and real-time reasoning data generated by the old defect identification model. Other test data is not used, thereby saving a lot of data collection costs.

It should be understood by those skilled in the art that FIG. 9 only shows a plurality of exemplary presentation forms, and boxes thereon may also have other arrangement modes. No limitation will be given to the arrangement mode of the boxes in the present disclosure.

The embodiment of the present disclosure provides a product defect analysis method based on a distributed system. The method may be all the methods implemented by the above distributed product defect system. It should be understood by those skilled in the art that the product defect analysis method may be respectively deployed in any same or different servers or clusters based on different steps or tasks.

Figure 10:
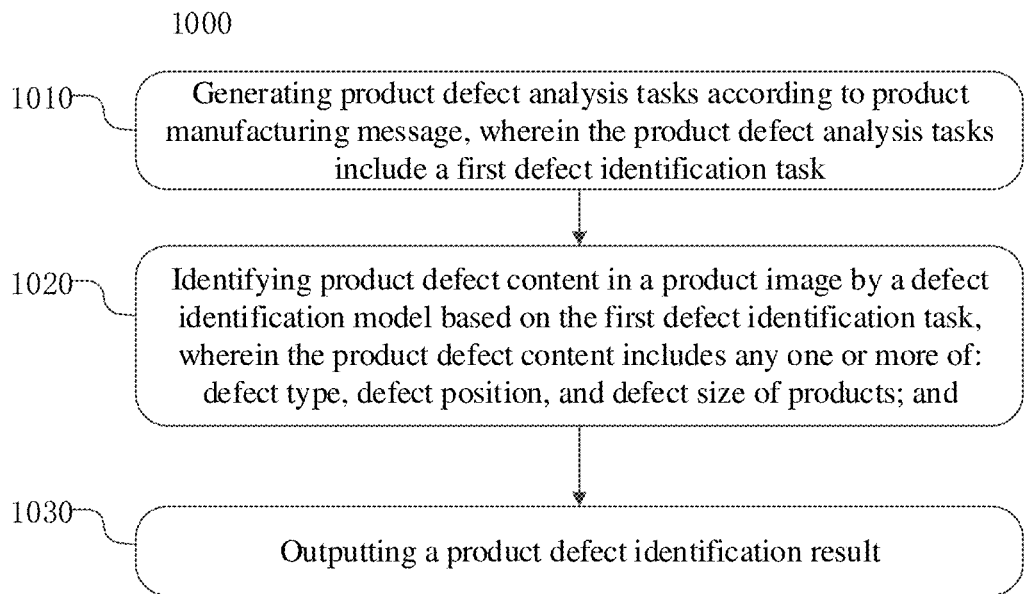
FIG. 10 is a schematic diagram of a product defect analysis method provided by at least one embodiment of the present disclosure.

FIG. 10 is a schematic diagram of a product defect analysis method 1000 provided by at least one embodiment of the present disclosure.

As shown in FIG. 10, optionally, the product defect analysis method 1000 based on the distributed system comprises the operations 1010 to 1030.

At operation 1010, product defect analysis tasks are generated according to product manufacturing messages, wherein the product defect analysis task includes a first defect identification task.

At operation 1020, product defect content in product images is identified by a defect identification model based on the first defect identification task, wherein the product defect content includes any one or more of defect type, defect position, and defect size of products.

At operation 1030, a product defect identification result is output.

In some embodiments of the present disclosure, the product manufacturing message includes lot-product manufacturing messages and a single product manufacturing message. Before the operation 1010, the method further includes monitoring the lot-product manufacturing messages by interrupt; and monitoring the single product manufacturing message by polling.

In some embodiments of the present disclosure, the operation 1010 also includes determining whether a defect identification model corresponding to the product type exists according to the product manufacturing message; generating the first defect identification task if a defect identification model corresponding to the product type exists; and generating a second defect identification task if no defect identification model corresponding to the product type exists.

Figure 11:
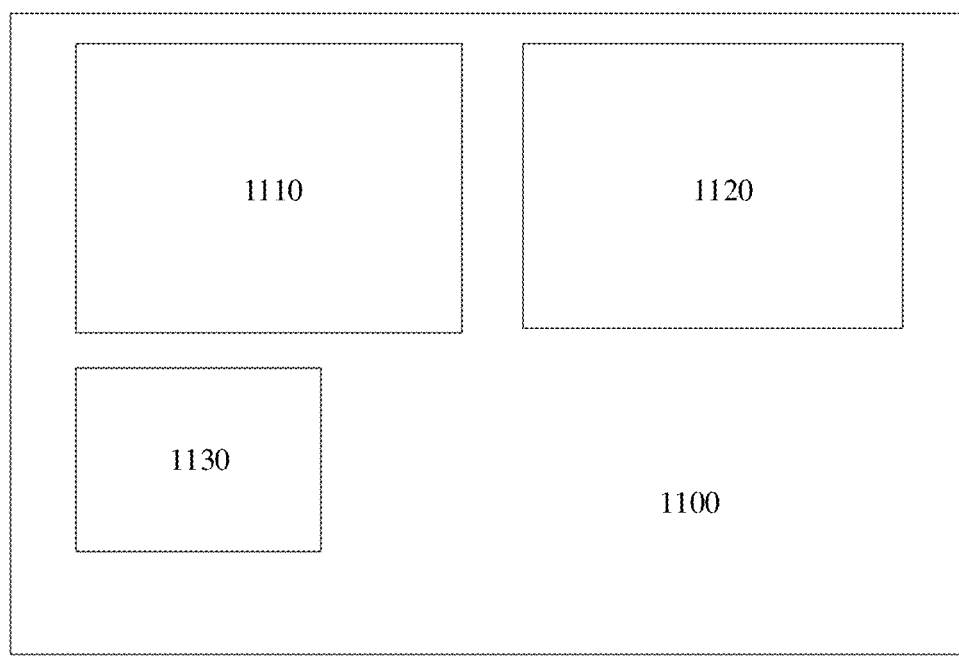
FIG. 11 is a schematic diagram of a distributed computing system for product defect analysis provided by another embodiment of the present disclosure.

FIG. 11 is a schematic diagram of a distributed computing system for product defect analysis 100 provided by another embodiment of the present disclosure, which includes an example computing device 1100 representing one or more systems and/or devices capable of realizing various techniques described here. The computing device 1100 may be a terminal device, a system on a chip (SOC), and/or any other suitable computing device or computing system.

The exemplary computing device 1100 as shown in the figure includes a processing system 1110, one or more computer-readable media 1120, and one or more input/output (I/O) interfaces 1130 which are communicated and coupled with each other. Although not shown, the computing device 1100 may also include a system bus or other data and command delivery system, which couple various components. The system bus may include any one or a combination of different bus structures. The bus structure is a memory bus or a memory controller, a peripheral bus, a universal serial bus, and/or any processor or local bus that utilizes various bus architectures. Various other examples such as control and data lines are also conceived.

The processing system 1110 represents the function of using hardware to execute one or more operations. Thus, as shown in the figure, the processing system 1110 is a hardware element that can be configured to be a processor, a functional block, etc. The system may include other logic devices implemented in hardware as an application-specific integrated circuit (ASIC) or formed by using one or more semiconductors. The hardware element is not limited by the forming materials or the processing mechanism adopted therein. For example, the processor may be composed of (a plurality of) semiconductors and/or transistors (e.g., electronic integrated circuit (IC)). In such a context, processor-executable instructions may be electronically executable instructions. The hardware element represents instruction, module, programmable device logic, and/or fixed device logic implemented in hardware, and in some embodiments, may be used to implement at least some aspects of the technology described herein. The hardware element may include an integrated circuit (IC) or a SOC, an ASIC, a field programmable gate array (FPGA), a complex programmable logic device (CPLD), and other implementations in silicon or components of other hardware devices. In this context, the hardware element can be used as a processing unit that executes program tasks defined by instructions, modules and/or logics embodied by the hardware element.

The computer-readable medium 1120 is illustrated as including a memory/storage device. The memory/storage device represents memory/storage capacity related to one or more computer-readable media. The memory/storage device may include hardware such as volatile and nonvolatile, removable and non-removable media and/or storage devices implemented by methods or techniques suitable for storing information (such as computer-readable instructions, data structures, program modules, logic elements/circuits or other data). The examples of the computer-readable storage medium may include but not limited to random access memory (RAM), read-only memory (ROM), electronically erasable programmable read-only memory (EEPROM), flash memory or other memory techniques, compact disc read-only memory (CD-ROM), digital video disk (DVD) or other optical storage devices, hard disk, cassette, magnetic tape, disk storage device or other magnetic storage devices, or other storage devices, tangible media, or products suitable for storing desired information and accessible by computers. The computer-readable medium 1120 may be configured by various other methods further described below.

Implementations of the described modules and technologies can be stored on a computer-readable medium of a certain form or transmitted through the computer-readable medium. The computer-readable media may include various media that can be accessed by the computing device 1100. By way of example and not limitation, the computer-readable medium may include "computer-readable storage medium" and "computer-readable signal medium".

Contrary to mere signal transmission, carrier waves, or signals, "computer-readable storage medium" refers to a medium and/or device capable of permanently storing information, and/or a tangible storage device. Therefore, the computer-readable storage media refers to non-signal bearing media. Computer-readable storage media include hardware such as volatile and nonvolatile, removable and non-removable media, and/or storage devices implemented by methods or techniques suitable for storing information (such as computer-readable instructions, data structures, program modules, logic elements/circuits, or other data). Examples of computer-readable storage media may include, but are not limited to, RAM, ROM, EEPROM, flash memory or other memory technologies, CD-ROM, DVD or other optical storage devices, hard disks, cassette tapes, magnetic tapes, disk storage device or other magnetic storage device, or other storage device, tangible medium or article suitable for storing desired information and accessible by a computer.

"Computer-readable signal medium" refers to a signal bearing medium configured to send instructions to the hardware of the computing device 1100, such as via the network. The signal medium can typically embody computer-readable instructions, data structures, program modules or other data in modulated data signals such as carrier waves, data signals, or other transmission mechanisms. The signal medium also includes any information transmission medium. The term "modulated data signal" refers to a signal that encodes information in the signal in such a way to set or change one or more of the characteristics. By way of example but not limitation, communication media includes wired media such as wired networks or direct connections, and wireless media such as acoustic wave, radio frequency (RF), infrared, and other wireless media.

One or more I/O interfaces 1130 represent functions that allow the user to enter commands and information into the computing device 1100 and also allow various I/O devices to present information to the user and/or other components or devices. Examples of input devices include keyboards, cursor control devices (e.g., mice), microphones (e.g., for voice input), scanners, touch functions (e.g., capacitive sensors or other sensors configured to detect physical touch), cameras (for example, visible or invisible wavelengths (such as infrared frequencies) can be used to detect motions that do not involve touch as gestures), etc. Examples of output devices include display devices (for example, monitors or projectors), speakers, printers, network cards, tactile response devices, etc. Therefore, the computing device 1100 can be configured in various ways described further below to support user interaction.

This document may describe various techniques in the general context of software hardware elements or program modules. Generally, these modules include routines, programs, objects, elements, components, data structures and the like that execute specific tasks or implement specific abstract data types. The terms "module", "function" and "component" used herein generally refer to software, firmware, hardware, or a combination thereof. The characteristics of the technologies described here are platform-independent, meaning that these technologies can be implemented on various computing platforms provided with various processors.

The foregoing combinations can also be used to implement various technologies and modules described herein. Therefore, software, hardware or program modules and other program modules may be implemented as one or more instructions and/or logics embodied on computer-readable storage media of a certain form and/or by one or more hardware elements. The computing device 110 may be configured to implement specific instructions and/or functions corresponding to software and/or hardware modules. Therefore, for example, by using computer-readable storage media and/or hardware elements of the processing system, the modules may be implemented at least partially in hardware to implement the modules as modules executable by the computing device 1100 as software. The instructions and/or functions may be executable/operable by one or more articles (for example, one or more computing devices 1100 and/or processing systems 1110) to implement the techniques, modules, and examples described herein.

The techniques described herein can be supported by these configurations of the computing device 1100 and are not limited to specific examples of the techniques described herein. The processing system 1110 and the computer-readable storage medium 1120 can also be implemented in whole or in part on the "cloud" by using the distributed system.

The present disclosure further provides a computer-readable storage medium on which computer-executable instructions are stored. When the instructions are executed by a computing device, the computing device implements the product defect analysis method 1000.

In the discussion herein, various different embodiments are described. It should be appreciated and understood that each embodiment described herein can be used alone or in association with one or more other embodiments described herein.

The AI technology adopted in the present disclosure can liberate manpower, greatly shorten the processing time of each product image, and at the same time, avoid the instability caused by pure manual detection. Some embodiments of the present disclosure are also helpful for early warning and warning prompts in time, so as to avoid the same undesirable defects produced continuously. The use of the AI technology greatly improves the detection accuracy, reduces or completely avoids missed detection, and can indirectly improve the yield. Due to the timely feedback of AI detection, the intermediate process can be adjusted in time, which can avoid the secondary generation of defects, thereby also indirectly improving the yield.

While the present disclosure has been described in conjunction with specific examples, those of skill in the art will appreciate that many changes and modifications can be made, and that components thereof can be substituted equivalently without departing from the true scope of the disclosure. In addition, many modifications can be made to adapt the teachings of the present disclosure to particular situations without departing from its central scope. Thus, the present disclosure is not limited to the particular embodiments disclosed herein as the best model conceived to implement the present disclosure, but rather the present disclosure includes all embodiments that fall within the scope of the appended claims.

The invention claimed is:

1. A distributed computing system for product defect analysis, comprising a computing cluster for processing product manufacturing messages, a computing cluster for identifying product defect, a product image database, and a client device, wherein:

the product image database is configured to store product images generated in the product manufacturing process;

the computing cluster for processing product manufacturing messages is configured to generate product defect analysis tasks according to product manufacturing messages, wherein the product defect analysis tasks include a first defect identification task;

the computing cluster for identifying product defect is configured to identify product defect content in one of the product images through a defect identification model based on the first defect identification task, wherein the product defect content includes any one or more of: defect type, defect position, and defect size of products; and the client device is configured to output a product defect identification result, wherein the product manufacturing messages include a first product manufacturing message related to registration information, and the computing cluster for processing product manufacturing messages is configured to monitor the first product manufacturing message by interrupt, wherein the product manufacturing messages further include a second product manufacturing message irrelevant to the registration information; and the computing cluster for processing product manufacturing messages is further configured to: monitor the second product manufacturing message by polling, determine whether the second product manufacturing message includes a product manufacturing keyword; keep the second product manufacturing message if the second product manufacturing message includes the product manufacturing keyword; and discard the second product manufacturing message if the second product manufacturing message does not include the product manufacturing keyword.

2. The distributed computing system for product defect analysis according to claim 1, wherein the first product manufacturing message includes a lot-product manufacturing message, and the second product manufacturing message includes a single product manufacturing message.

3. The distributed computing system for product defect analysis according to claim 1, wherein generating the product defect analysis tasks according to the product manufacturing messages includes:

determining whether a defect identification model corresponding to the product type exists according to the product manufacturing message;

generating the first defect identification task if a defect identification model corresponding to the product type exists; and sending a first defect analysis task to the computing cluster for identifying product defect.

4. The distributed computing system for product defect analysis according to claim 3, wherein generating the product defect analysis tasks according to the product manufacturing messages further includes:

generating a second defect identification task if no defect identification model is corresponding to the product type; and sending a second defect analysis task to the client device.

5. The distributed computing system for product defect analysis according to claim 1, wherein the computing cluster for processing product manufacturing messages is configured to:

establish a product defect analysis task queue by sorting a plurality of product defect analysis tasks based on one or more of: the time sequence of generating the plurality of product defect analysis tasks, a priority order of products, and a product scheduling plan.

6. The distributed computing system for product defect analysis according to claim 5, wherein the computing cluster for processing product manufacturing messages is further configured to:

control a speed of sending the product defect analysis tasks in the product defect analysis task queue according to a load status of the computing cluster for identifying product defect.

7. The distributed computing system for product defect analysis according to claim 1, wherein the defect identification model includes any one or more of: a feedforward neural network defect identification model, a convolutional neural network model, a recurrent neural network model, and a generative adversarial network model.

8. The distributed computing system for product defect analysis according to claim 1, wherein the client device includes a display; and wherein outputting the product defect identification result further includes:

displaying, by the display, a product image of which product defect is identified by the computing cluster for identifying product defect.

9. The distributed computing system for product defect analysis according to claim 8, wherein the product image of which product defect is identified by the computing cluster for identifying product defect is labeled with a product defect content label, and the product defect content label includes any one or more of: defect mark box, defect mark box coordinate, defect category label, and defect category score.

10. The distributed computing system for product defect analysis according to claim 8, wherein the display is configured to display a product image of which the product defect cannot be identified by the computing cluster for identifying product defect.

11. The distributed computing system for product defect analysis according to claim 10, wherein the client device is also configured to:

obtain a product defect identification instruction inputted by a user; and display the product defect content label of the product images of which the product defect cannot be identified by the computing cluster for identifying product defect based on the product defect identification instruction.

12. The distributed computing system for product defect analysis according to claim 9, wherein the client device is further configured to:

obtain a product defect rechecking instruction inputted by a user; and confirm or modify the product defect content label in a product image to be rechecked based on the product defect rechecking instruction.

13. The distributed computing system for product defect analysis according to claim 8, wherein the display is further configured to:

display a task list corresponding to a plurality of product defect analysis tasks;

wherein the client device is further configured to:

obtain an execution priority adjustment instruction of the plurality of product defect analysis tasks inputted by the user; and modify the sorting of the product defect analysis tasks in the task list based on the execution priority adjustment instruction.

14. The distributed computing system for product defect analysis according to claim 1, wherein the computing cluster for processing product manufacturing messages is further configured to generate a defect identification model training task; and the computing cluster for identifying product defect is further configured to train the defect identification model based on the defect identification model training task.

15. A product defect analysis method based on a distributed system, comprising:
   generating product defect analysis tasks according to product manufacturing messages, wherein the product defect analysis tasks include a first defect identification task;
   identifying product defect content in a product image by a defect identification model based on the first defect identification task, wherein the product defect content includes any one or more of: defect type, defect position, and defect size of products; and
   outputting a product defect identification result,
   wherein the product manufacturing messages include a first product manufacturing message related to registration information, and the first product manufacturing message is monitored by interrupt, and
   wherein, the product manufacturing messages further include a second product manufacturing message irrelevant to the registration information, and the second product manufacturing message is monitored by polling, wherein, the second product manufacturing message is kept if the second product manufacturing message includes the product manufacturing keyword, and the second product manufacturing message is discarded if the second product manufacturing message does not include the product manufacturing keyword.

16. The product defect analysis method according to claim 15, wherein generating the product defect analysis tasks according to the product manufacturing messages includes:
   determining whether a defect identification model is corresponding to the product type according to the product manufacturing messages;
   generating the first defect identification task if a defect identification model is corresponding to the product type; and
   generating a second defect identification task if no defect identification model is corresponding to the product type.

17. A non-volatile computer-readable storage medium with computer programs stored thereon, when the programs are executed by a processor, the product defect analysis method according to claim 15 is implemented.

* * * * *